United States Patent
Hori

(10) Patent No.: US 7,930,558 B2
(45) Date of Patent: Apr. 19, 2011

(54) DATA RECORDER RESTORING ORIGINAL DATA ALLOWED TO EXIST ONLY UNIQUELY

(75) Inventor: Yoshihiro Hori, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1286 days.

(21) Appl. No.: 10/471,670

(22) PCT Filed: Sep. 10, 2001

(86) PCT No.: PCT/JP01/07862
§ 371 (c)(1),
(2), (4) Date: Sep. 15, 2003

(87) PCT Pub. No.: WO02/075550
PCT Pub. Date: Sep. 26, 2002

(65) Prior Publication Data
US 2004/0088510 A1 May 6, 2004

(30) Foreign Application Priority Data
Mar. 15, 2001 (JP) .................................. 2001-73827

(51) Int. Cl.
*H04L 9/32* (2006.01)
(52) U.S. Cl. ........................................ 713/193; 711/165
(58) Field of Classification Search .................... 713/171
See application file for complete search history.

(56) References Cited

U.S. PATENT DOCUMENTS

| | | | | |
|---|---|---|---|---|
| 5,621,797 A * | 4/1997 | Rosen | ............................. | 705/76 |
| 5,794,072 A * | 8/1998 | Nomura et al. | ................... | 710/40 |
| 6,522,581 B2 * | 2/2003 | Takata et al. | .............. | 365/185.05 |
| 6,745,166 B1 * | 6/2004 | Sugahara et al. | ............... | 705/57 |
| 6,920,567 B1 * | 7/2005 | Doherty et al. | .................. | 726/22 |

FOREIGN PATENT DOCUMENTS

| | | |
|---|---|---|
| EP | 1 047 062 A2 | 10/2000 |
| JP | 2000-285028 A | 10/2000 |
| JP | 2000-305853 A | 11/2000 |
| JP | 2001-14221 A | 1/2001 |
| JP | 2001-22859 A | 1/2001 |
| JP | 2001-51906 A | 2/2001 |

\* cited by examiner

*Primary Examiner* — Jung Kim
*Assistant Examiner* — Devin Almeida
(74) *Attorney, Agent, or Firm* — McDermott Will & Emery LLP

(57) ABSTRACT

A log region (1415A) and a license region (1415B) are arranged in a memory of a memory card. The license region (1415B) stores licenses such as license IDs and license keys Kc as well as validity flags corresponding to entry numbers 0-(N−1). The log region (1415A) includes a receive log (70) and a send log (80). The memory card serving as a sender of the license accepts a receive state from the memory card on a receiver side, and validates the validity flag of a region designated by the entry number in the send log (8) when the receive state is ON. Consequently, even when communication is interrupted during shifting or copying of the license, the license to be shifted or copied can be restored.

14 Claims, 20 Drawing Sheets

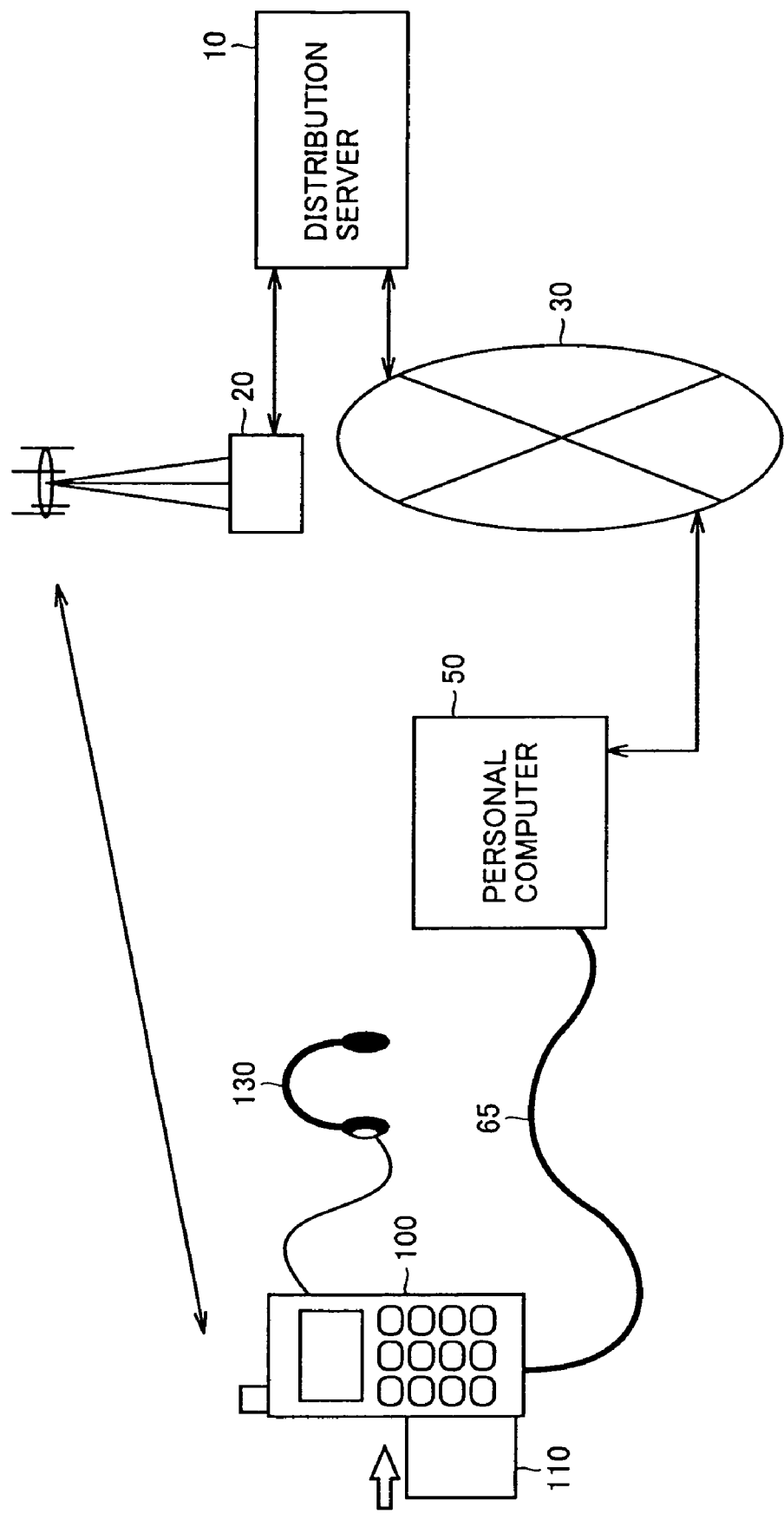

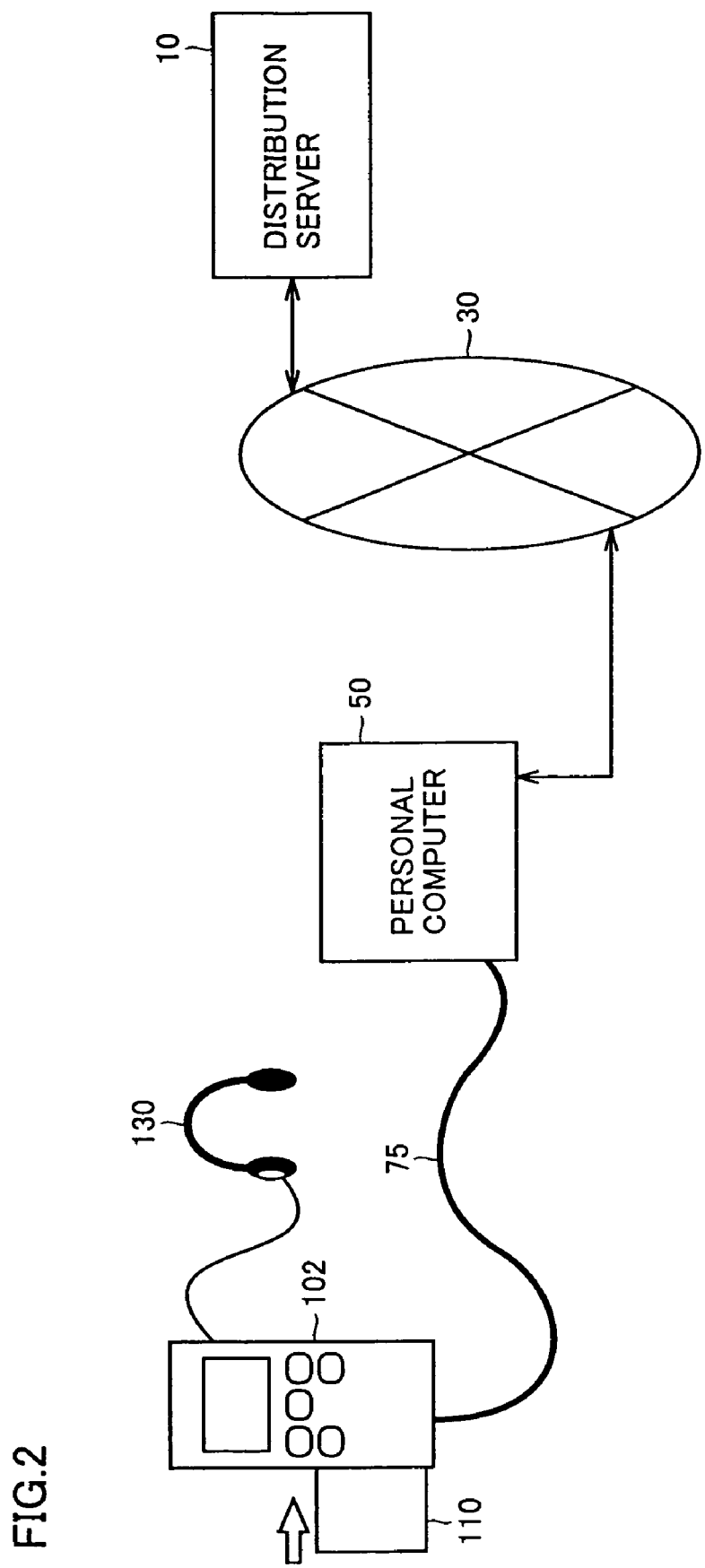

FIG.3

| SYMBOL | TYPE | ATTRIBUTE | CHARACTERISTIC |
|---|---|---|---|
| Dc | CONTENT DATA | PECULIAR TO CONTENTS | EX.: MUSIC DATA, RECITAL DATA, EDUCATIONAL DATA OR IMAGE DATA ENCRYPTED CONTENT DATA DECRYPTABLE WITH Kc DISTRIBUTED AS {Dc}Kc AND HELD IN MEMORY CARD |
| Dc-inf | ADDITIONAL INFORMATION | PECULIAR TO CONTENTS | PLAINTEXT DATA RELATED TO Dc |
| Kc | LICENSE | PECULIAR TO CONTENTS | LICENSE DECRYPTION KEY DECRYPTING ENCRYPTED CONTENT DATA |
| ACm/ACp | LICENSE | PECULIAR TO LICENSE | RESTRICTION INFORMATION RESTRICTIONS ON REPRODUCTION AND LICENSE HANDLING |
| CONTENT ID | LICENSE | PECULIAR TO CONTENTS | ADMINISTRATION CODE FOR SPECIFYING CONTENTS |
| LICENSE ID | LICENSE | PECULIAR TO LICENSE | ADMINISTRATION CODE FOR SPECIFYING LICENSE |
| LICENSE | LICENSE | PECULIAR TO LICENSE | GENERAL TERM OF Kc + ACm + ACp + CONTENT ID + LICENSE ID |
| VALIDITY FLAG | FLAG | PECULIAR TO LICENSE | ENABLE/DISABLE EXTERNAL OUTPUT OF LICENSE FROM MEMORY CARD |

FIG.4

| | SYMBOL | TYPE | ATTRIBUTE | CHARACTERISTIC |
|---|---|---|---|---|
| DISTRIBUTION SERVER | KPa/KPb | PUBLIC CERTIFICATION KEY | SYMMETRIC IN SYSTEM | KEY DECRYPTING CERTIFICATION DATA BY CERTIFICATION AUTHORITY KPa = LEVEL 1, KPb = LEVEL 2 |
| | Ks1 | SYMMETRIC KEY | PECULIAR TO SESSION | GENERATED FOR EVERY LICENSE DISTRIBUTION TO MEMORY CARD AND LICENSE-DEDICATED MEMORY CARD |
| MEMORY CARD | KPa | PUBLIC CERTIFICATION KEY | SYMMETRIC IN SYSTEM | KEY DECRYPTING CERTIFICATION DATA BY CERTIFICATION AUTHORITY SAME AS KPa IN DISTRIBUTION SERVER |
| LICENSE-DEDICATED MEMORY CARD | KPmw | PUBLIC ENCRYPTION KEY | PECULIAR TO CLASS | STORED AS CERTIFICATION DATA ENCRYPTED IN CERTIFICATION AUTHORITY TOGETHER WITH CERTIFICATE Cmw w IS IDENTIFIER OF CLASS |
| | Kmw | PRIVATE DECRYPTION KEY | PECULIAR TO CLASS | ASYMMETRICAL DECRYPTION KEY DECRYPTING DATA ENCRYPTED WITH PUBLIC ENCRYPTION KEY KPmw |
| | KPmcx | PUBLIC ENCRYPTION KEY | INDIVIDUAL | PECULIAR TO EACH MEMORY CARD x IS IDENTIFIER OF MODULE |
| | Kmcx | PRIVATE DECRYPTION KEY | INDIVIDUAL | ASYMMETRICAL DECRYPTION KEY DECRYPTING DATA ENCRYPTED WITH PUBLIC ENCRYPTION KEY KPmcx |
| | Ks2 | SYMMETRIC KEY | PECULIAR TO SESSION | GENERATED FOR EVERY LICENSE TRANSMISSION TO/FROM DISTRIBUTION SERVER OR MUSIC REPRODUCTION MODULE |
| | Cmw | CERTIFICATE | CLASS CERTIFICATE | CLASS CERTIFICATE OF MEMORY CARD AND LICENSE-DEDICATED MEMORY CARD HAVING CERTIFICATION FUNCTION RECORDED IN FORM OF {KPmw//Cmw}KPa WHEN SHIPPED * BEING DIFFERENT DEPENDING ON CLASS w OF MEMORY CARD, LICENSE ADMINISTRATION DEVICE AND LICENSE ADMINISTRATION MODULE |
| CONTENT REPRODUCING CIRCUIT | KPpy | PUBLIC ENCRYPTION KEY | PECULIAR TO CLASS | HELD AS CERTIFICATION DATA ENCRYPTED BY CERTIFICATION AUTHORITY TOGETHER WITH CERTIFICATE Cmw y IS IDENTIFIER OF CLASS |
| | Kpy | PRIVATE DECRYPTION KEY | PECULIAR TO CLASS | ASYMMETRICAL DECRYPTION KEY FOR DECRYPTING DATA ENCRYPTED WITH PUBLIC ENCRYPTION KEY KPpy |
| | Ks3 | SYMMETRIC KEY | PECULIAR TO SESSION | GENERATED FOR EVERY REPRODUCTION SESSION TO/FROM DISTRIBUTION SERVER OR MUSIC REPRODUCTION MODULE |
| | Cpy | CERTIFICATE | CLASS CERTIFICATE | CLASS CERTIFICATE OF CONTENT REPRODUCING CIRCUIT, HAVING CERTIFICATION FUNCTION RECORDED IN FORM OF {KPpy//Cpy}KPa WHEN SHIPPED * BEING DIFFERENT DEPENDING ON CLASS y OF CONTENT REPRODUCING CIRCUIT |

FIG.19

| RECEIVER MEMORY CARD 110 | CONTROLLER | SENDER MEMORY CARD 120 |
|---|---|---|

FROM S412 OR S432 OR S434

FROM S436

↓

S438 — ACCEPT LICENSE ID//{Ks2b}Ks2c//RECEIVE State//{hash}Ks2c

↓

S440 — DETERMINE HASH VALUE OF LICENSE ID//{Ks2b}Ks2c//RECEIVE State

↓

S442 — DECRYPT {hash}Ks2c WITH Ks2c TO ACCEPT hash

↓

S444 — CONFIRM hash → MISMATCH

↓ MATCH

S446 — CONFIRM RECEIVE State → OFF

↓ ON

S448 — DECRYPT {Ks2b}Ks2c WITH Ks2c TO ACCEPT Ks2b

↓

S450 — CONFIRM Ks2b, COMPARE IT WITH Ks2b IN SEND LOG → MISMATCH

↓ MATCH

S452 — CONFIRM ENTRY NUMBER IN SEND LOG → NO

↓ YES

S454 — OBTAIN LICENSE ID IN ENTRY DESIGNATED BY SEND LOG

↓

S456 — CONFIRM LICENSE ID, COMPARE IT WITH LICENSE ID IN ENTRY → MISMATCH

↓ MATCH

S458 — VALIDATE VALIDITY FLAG OF LICENSE IN ENTRY DESIGNATED BY SEND LOG

↓

S460 — INITIALIZE SEND LOG

↓

END — S462

DATA RECORDER RESTORING ORIGINAL DATA ALLOWED TO EXIST ONLY UNIQUELY

TECHNICAL FIELD

The present invention relates to a data storage device for shifting and/or copying specific data to another data storage device, and particularly for shifting and/or copying data, which is allowed to exist uniquely, such as a license for decrypting and reproducing encrypted data obtained by a data distribution system, which can ensure copyright protection for copied information.

BACKGROUND ART

Owing to progress in digital information communication networks and others such as the Internet in recent years, users can now easily access network information through individual-oriented terminals using cellular phones or the like.

In such a digital information communication network, information is transmitted by digital signals. Even when an individual user copies music or video data transmitted via the aforementioned information communication network, it is now possible to obtain copied data without degrading audio and/or image qualities.

Therefore, the copyright of the owner may be significantly infringed unless appropriate measures are taken for copyright protection when a copyrighted content such as music data or image data is transmitted over the digital information communication network.

However, if copyright protection is given top priority, it may become impossible to distribute content data over the fast-growing digital information communication network. This impairs an interest of the copyright owner, who can essentially collect predetermined copyright royalties for copies of the copyrighted data.

Instead of the distribution over the digital information communication network described above, distribution may be performed via record mediums storing digital data. In connection with the latter case, music data recorded on CDs (compact disks) on the market can be freely copied in principle onto magneto-optical disks (e.g., MDs) as long as the copied music is only for the personal use. However, personal users performing digital recording or the like indirectly pay predetermined amounts in prices of digital recording devices and mediums as guaranty moneys to a copyright owner.

In view of the fact that the music data is digital data, which does not cause copy deterioration of information when it is copied as digital signals from a CD to an MD, such devices and structures are employed for copyright protection that the copied music information cannot be copied as digital data from the recordable MD to another MD.

In view of the above, the public distribution itself of the content data such as music data and image data over the digital information communication network is restricted by the public transmission right of the copyright owner, and therefore sufficient measures must be taken for the copyright protection in such distribution.

In the above case, it is necessary to inhibit unauthorized further copying of the content data such as copyrighted music data or image data, which was once sent to the public over the digital information communication network.

Such a data distribution system has been proposed that a distribution server holding the encrypted content data distributes the encrypted content data to memory cards attached to terminal devices such as cellular phones via the terminal devices. In this data distribution system, a public encryption key of the memory card, which has been certified by a certification authority, and its certificate are sent to the distribution server when requesting the distribution of the encrypted content data. After the distribution server confirms the reception of the certified certificate, the encrypted content data and a license key for decrypting the encrypted content data are sent to the memory card. When distributing the license key, the distribution server and the memory card generate session keys, which are different from those generated in other distribution. With the session keys thus generated, the public encryption key is encrypted, and the keys are exchanged between the distribution server and the memory card.

Finally, the distribution server sends the license, which is encrypted with the public encryption key peculiar to each memory card, and is further encrypted with the session key, as well as the encrypted content data to the memory card. The memory card records the license key and the encrypted content data thus received in the memory card.

When the encrypted content data recorded in the memory card is to be reproduced, the memory card is attached to the cellular phone. In addition to an ordinary function of the telephone, the cellular phone has a dedicated circuit for decrypting the encrypted content data sent from the memory card, and reproducing it for external output.

As described above, the user of the cellular phone can receive the encrypted content data from the distribution server via the cellular phone, and can reproduce the encrypted content data.

In another manner, encrypted content data is distributed over the Internet to personal computers. For distributing the encrypted content data to the personal computers, software installed in the personal computer is used for distributing the encrypted content data. Security for the encrypted content data in a distribution using the software is lower than that achieved by writing the encrypted content data in a memory card. If a device achieving the same security as the memory card is attached to the personal computer, the same distribution as that of the encrypted content data to the cellular phone can be performed for the personal computer.

Thereby, the personal computer receives the encrypted content data by installed software and the above device. Thus, the personal computer receives the encrypted content data of a different security level.

Further, music CDs storing music data are very popular, and ripping has been performed for obtaining the music data from the music CDs. The ripping produces encrypted music data (encrypted content data) from the music data and a license for decrypting and reproducing the encrypted music data. In the ripping, a watermark defining rules of use of the content data is detected from the content data, and the encrypted content data and the license are produced according to the contents of the watermark thus detected.

As described above, the cellular phone and the personal computer receive the encrypted content data and the license from the distribution server. The users of the cellular phone and the personal computer may intend to shift or copy the encrypted content data and the license thus received to a cellular phone or a personal computer of another user. In this case, the user can freely shift or copy the encrypted content data to the cellular phone or the personal computer of another user, but cannot freely shift the license, which is used for decrypting the encrypted content data, to the cellular phone or the personal computer of another user. When the license is shifted or copied to the cellular phone or the personal computer of another user, it is impossible to leave the license on both the sender side and receiver side in view of the copyright protection of the encrypted content data. Accordingly, the license on the sender side is deleted when the license is shifted or copied.

However, in a conventional license shift/copy method, when communication is interrupted during shifting or copying of a license to another user, this user on the receiver side cannot receive the license, and further the license is deleted on the sender side so that the encrypted content data cannot be decrypted with the license to be shifted or copied.

DISCLOSURE OF THE INVENTION

Accordingly, an object of the invention is to provide a data storage device capable of restoring specific data such as a license, which is allowed to exist uniquely and is to be shifted, even when communication is interrupted during shifting of the specific data to another data storage device.

According to the invention, a data storage device for shifting specific data allowed to exist uniquely to a different data storage device, includes a history information holding unit holding first history information for specifying processing of shifting the specific data to the different data storage device; a specific data holding unit holding the specific data; and a control unit. The control unit changes a state to a state inhibiting external output of the specific data in the operation of shifting the specific data to the different data storage device, receives, in response to a request for restoration of the specific data, communication information representing a state of communication with the different data storage device and held in the different data storage device and second history information for specifying the shifting processing held in the different data storage device, checks the state of communication with the different data storage device based on the communication information, determines whether the second history information matches with the first history information or not, when the communication information represents that the shifting is being performed, and restores the state allowing external output of the specific data when the second history information matches with the first history information.

Preferably, the specific data holding unit further holds an output enable/disable flag indicating whether a part or a whole of the specific data can be externally output or not, and the control unit sets the output enable/disable flag to disable the output in the operation of shifting the specific data to the different data storage device, and sets the output enable/disable flag to enable the output in the operation of restoring the specific data.

Preferably, the history information holding unit further holds the specific data to be shifted in a state disabling the external output. When shifting the specific data to the different data storage device, the control unit provides the specific data to be shifted to the history information holding unit, and erases the specific data to be shifted from the specific data holding unit. When restoring the specific data, the control unit writes the specific data held in the history information holding unit in the specific data holding unit.

Preferably, the first history information is a first session key produced by the different data storage device when the communication for the shifting is established, and received from the different data storage device, and the second history information is a second session key produced by the different data storage device when the communication for the shifting is established, and being the same as the first session key held by the different data storage device.

Preferably, the data storage device further includes signature determining means determining validity of the communication information and the second history information based on an electronic signature, and the control unit further receives the electronic signature added to the communication information and the second history information from the different data storage device together with the communication information and the second history information, and determines the communication state and the fact that the first history information matches with the second history information when the signature determining means confirms the validity of the communication information and the second history information.

Preferably, the data storage device further includes a session key producing unit producing a session key for specifying the communication with the different data storage device, and a decrypting unit decrypting the data encrypted with the session key produced by the session key producing unit. In an operation of restoring the specific data, the session key producing unit produces a third session key specifying communication for restoring the specific data, and the control unit sends the third session key to the different data storage device, and receives the second history information encrypted with the third session key from the different data storage device.

Preferably, the data storage device further includes a session key producing unit producing a session key for specifying the communication with the different data storage device, and a decrypting unit decrypting the data encrypted with the session key produced by the session key producing unit. In an operation of restoring the specific data, the session key producing unit produces a third session key specifying communication for restoring the specific data, and the control unit sends the third session key to the different data storage device, and receives the second history information encrypted with the third session key and data of the electronic signature encrypted with the third session key from the different data storage device.

Preferably, the history information holding unit holds first data specifying information included in the specific data to be shifted together with the first history information, and the control unit further determines whether second data specifying information received from the different data storage device and being to be shifted matches with the first data specifying information or not. When the second data specifying information matches with the first data specifying information, the control unit determines the communication information, and confirms the matching of the first history information with the second history information.

Preferably, the data storage device further includes signature determining means for determining validity of the communication information, the second history information and the second data specifying information based on an electronic signature. The control unit further receives the electronic signature added to the communication information, the second history information and the second data specifying information together with the communication information, the second history information and the second data specifying information. When the signature determining means confirms the validity of the communication information, the second history information and the second data specifying information, the control unit confirms the matching of the second data specifying information with the first data specifying information, determines the communication information and confirms the matching of the first history information with the second history information.

Preferably, the data storage device further includes a communication information holding unit holding additional communication information representing a state of communication with the different data storage device or an additional data storage device other than the different data storage device, and an additional history information holding unit holding third history information for specifying processing of shifting the specific data from the different data storage device or the additional data storage device. When the control unit receives, from the different data storage device or the additional data storage device, the specific data to be shifted in the processing of shifting the specific data, the control unit records third history information in the additional history information holding unit, and provides the communication information and the third history information in accordance with an externally applied request for output of the history information.

Preferably, the data storage device further includes a session key producing unit producing a session key for specifying communication with the different data storage device or the additional data storage device. The session key producing unit produces a fourth session key specifying communication for receiving, from the different data storage device or the additional data storage device, the specific data to be shifted in the processing of shifting the specific data. When the communication is established for receiving the specific data to be shifted from the different data storage device or the additional data storage device, the control unit sends the fourth session key to the different data storage device or the additional data storage device, stores the fourth session key as the third history information in the additional history information holding unit, and provides the additional communication information and the third history information in response to an externally applied request for output of the history information.

Preferably, the data storage device further includes an electronic signature producing unit producing an electronic signature for the additional communication information and the third history information, and the control unit provides the additional communication information, the third history information and the electronic signature in response to an externally applied request for output of the history information.

Preferably, the data storage device further includes an encryption processing unit performing encryption with a fifth session key provided from the different data storage device or the additional data storage device. When communication is established for receiving the specific data from the different data storage device or the additional data storage device, the control unit provides the fourth session key to the different data storage device or the additional data storage device, stores the fourth session key as the third history information in the additional history information holding unit, and provide the additional communication information and the third history information encrypted with the fifth session key by the encryption processing unit in response to an externally applied request for output of the history information.

Preferably, the data storage device further includes an encryption processing unit encrypting data with a fifth session key provided from the different data storage device or the additional data storage device, and an electronic signature producing unit producing an electronic signature for the communication information and third history information encrypted by the encryption processing unit with an externally provided third session key. The encryption processing unit encrypts the third history information and the electronic signature with the fifth session key. When communication is established for receiving the specific data from the different data storage device or the additional data storage device, the control unit provides the fourth session key to the different data storage device or the additional data storage device, stores the fourth session key as the third history information in the additional history information holding unit, and provides the communication information, the third history information encrypted with the fifth session key and the electronic signature encrypted with the fifth session key in accordance with an externally applied request for output of the history information.

Preferably, the control unit records, in the communication information holding unit, third data specifying information specifying the specific data to be shifted from the different data storage device or the additional data storage device, and responds to a request for output of the third data specifying information by reading the third data specifying information from the communication information holding unit and providing the third data specifying information together with the communication information and the third history information.

Preferably, the specific data is a license for decrypting the encrypted content data.

According to the invention, therefore, it is possible to restore the data, which is allowed to exist uniquely and is to be shifted, even when the communication is interrupted during shifting of the specific data to the different data storage device.

BRIEF DESCRIPTION OF THE DRAWINGS

FIG. 1 is a schematic view showing a concept of a data distribution system.

FIG. 2 is a schematic view showing a concept of another data distribution system.

FIG. 3 illustrates characteristics of data, information and others for communication in the data distribution systems shown in FIGS. 1 and 2.

FIG. 4 illustrates characteristics of data, information and others for communication in the data distribution systems shown in FIGS. 1 and 2.

FIG. 19 is a second flowchart illustrating a restoring operation for the license.

BEST MODE FOR CARRYING OUT THE INVENTION

Figure 5:
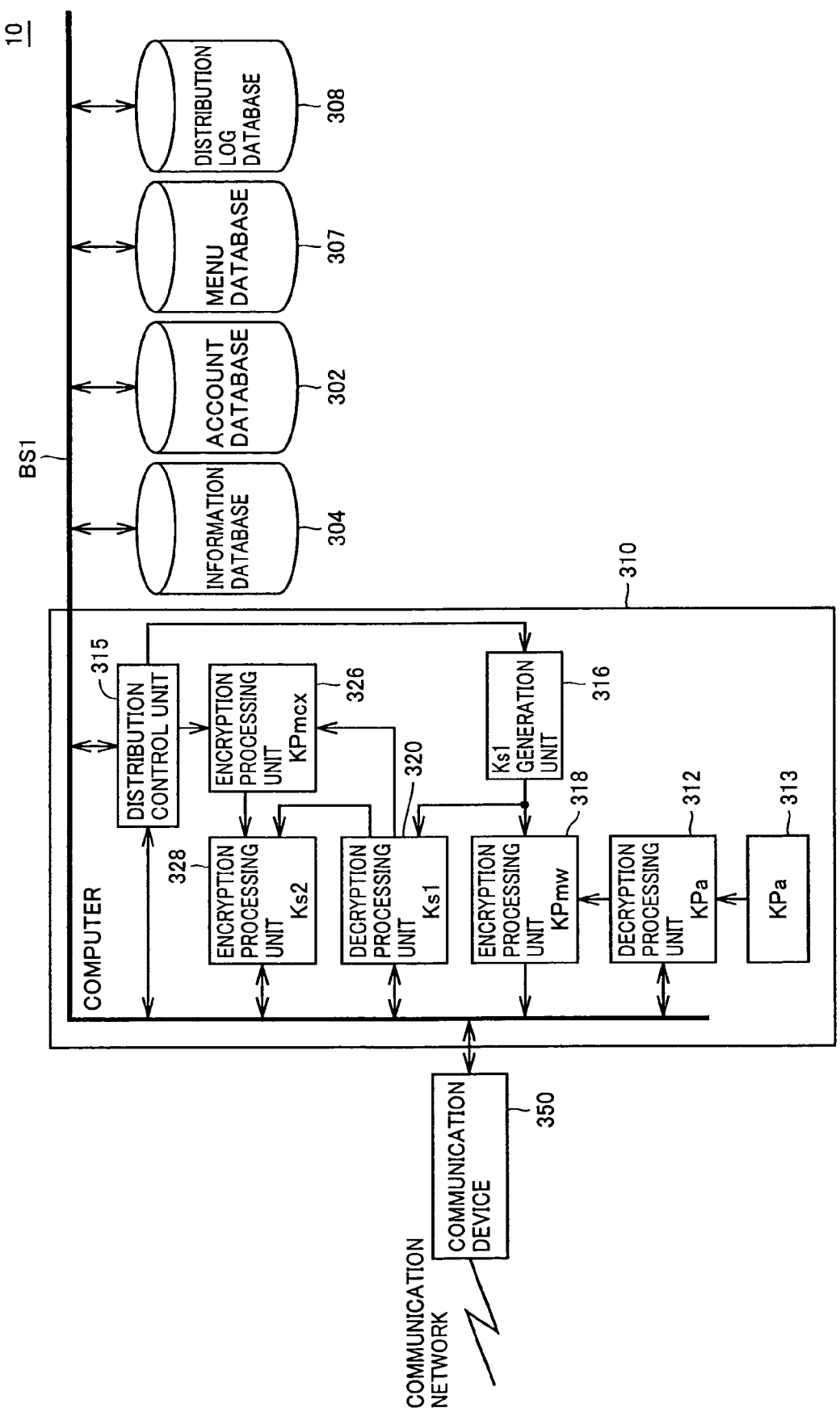
FIG. 5 is a schematic block diagram showing a structure of a distribution server in the data distribution systems shown in FIGS. 1 and 2.

Embodiments of the invention will now be described with reference to the drawings. The same or similar parts or units bear the same reference numbers in the figures, and description thereof is not repeated.

FIG. 1 is a schematic diagram showing a concept of a whole structure of a data distribution system, in which a data storage device according to the invention obtains encrypted content data and a license for decrypting the encrypted content data.

Description will now be given by way of example on a data distribution system distributing music data to a memory card 110 of each user via a cellular phone network as well as a data distribution system distributing music data to a personal computer on the Internet. However, as will become apparent from the following description, the present invention is not restricted to such a case. The present invention is applicable to distribution of other copyrighted materials, i.e., content data such as image data or movie data.

Referring to FIG. 1, a distribution carrier 20 relays a distribution request, which is sent from a user over a cellular phone network, to a distribution server 10. Distribution server 10, which manages or controls the music data, determines whether memory card 110 attached to a cellular phone 100 of the user requesting the data distribution has valid or regular certification data or not, and thus whether memory card 110 is a regular memory card or not. For protecting the copyright relating to the regular memory card, distribution server 10 encrypts the music data, which will also be referred to as "content data" hereinafter, in a predetermined encryption manner, and provides the encrypted content data and a license, which includes a license key for decrypting the encrypted content data and serves as information required for reproducing the encrypted content data, to distribution carrier 20, i.e., the cellular phone company.

Distribution carrier 20 sends the encrypted content data and the license over the cellular phone network and via cellular phone 100 to memory card 110 attached to cellular phone 100, which sent the distribution request over its own cellular phone network.

In FIG. 1, memory card 110 is releasably attached to cellular phone 100 of the cellular phone user. Memory card 110 receives the encrypted content data received by cellular phone 100, decrypts this content data, which was encrypted for the copyright protection, and then provides the data to a music reproducing circuit (not shown) in cellular phone 100.

For example, the cellular phone user can "reproduce" the content data to listen to the music via headphones 130 or the like connected to cellular phone 100.

By such a structure, any user cannot receive the distribution data from distribution server 10 for reproducing the music without memory card 110.

Distribution server 20 may be configured such that distribution server 20 counts the operations of distributing content data of, e.g., one song, and collects the copyright royalty fee, which is charged for every reception (downloading) of the content data by a user, together with a fee for a telephone call of the cellular phone. Thereby, the copyright owner can easily ensure the royalty fee.

In FIG. 1, distribution server 10 receives the distribution request issued from a user of a personal computer 50 over an Internet network 30. Then, distribution server 10 determines whether personal computer 50 accessing thereto for data distribution uses a license-dedicated memory card (not shown) having valid certification data or not, and thus whether the regular license-dedicated memory card is used or not. To the personal computer provided with the valid license-dedicated memory card is used, distribution server 10 sends the encrypted content data, which is prepared by encrypting the music data in a predetermined encryption manner for copyright protection, as well as the license including the license key (i.e., the decryption key of the encrypted content data) over Internet network 30. The license-dedicated memory card of personal computer 50 stores the received license.

Personal computer 50 is provided with the license-dedicated memory card (hardware) having the same function as the function of memory card 110 relating to the license administration. Thereby, personal computer 50 can receives the same distribution as that received by cellular phone 100 and memory card 110.

Further, personal computer 50 is connected to cellular phone 100 via a dedicated cable 65 for sending the encrypted content data and the license to memory card 110 attached to cellular phone 100.

In the data distribution system shown in FIG. 1, therefore, memory card 110 attached to cellular phone 100 receives and stores the encrypted content data and the license sent from distribution server 10 over the cellular phone network. Also, memory card 110 can receive and store the encrypted content data and the license, which are obtained from distribution server 10 over Internet network 30, from personal computer 50.

Memory card 110 attached to cellular phone 100 can save the encrypted content data and the license, which are received from distribution server 10 over the cellular phone network, in personal computer 50.

FIG. 2 shows a data distribution system using a reproduction terminal 102, which does not have a function of receiving the encrypted content data and the license from distribution server 10 over the cellular phone network. In the data distribution system shown in FIG. 2, memory card 110 attached to reproduction terminal 102 receives and stores the encrypted content data and the license, which are obtained from distribution server 10 by personal computer 50. Since personal computer 50 obtains the encrypted content data and the license in this manner, even the user of reproduction terminal 102 not having a communication function can receive the encrypted content data.

In the structures shown in FIGS. 1 and 2, the system requires the followings for allowing reproduction of the content data, which is distributed in the encrypted form, on the user side of the cellular phone or the personal computer. First, it requires a manner for distributing the license in the communication system. Second, the manner of encrypting the content data is required. Third, it is required to employ the structure of achieving the copyright protection for preventing unauthorized copying of the content data.

Embodiments of the invention, which will now be described, particularly relate to structures for enhancing the ability of copyright protection. Particularly, the embodiments are configured to enhance the functions of certifying and checking the destination of the license keys every time the distribution processing or the reproduction processing occurs, and thereby to prevent output of the content data to the uncertified recording devices (the memory card, license-dedicated memory card and others) and uncertified reproduction terminals (the cellular phone with the content reproducing circuit, personal computer and others) so that leakage of the license key is prevented, and the copyright protection is enhanced.

In the following description, transmission of the encrypted content data or the license thereof from distribution server 10 to the cellular phone, personal computer or the like will be referred to as "distribution".

FIG. 3 illustrates characteristics of data, information and others used for communication in the data distribution systems shown in FIGS. 1 and 2.

First, data distributed from distribution server 10 will be described. Dc indicates the content data such as music data. Content data Dc is encrypted, and can be decrypted with a license key Kc. Encrypted content data {Dc}Kc, which can be decrypted with license key Kc, is distributed by distribution server 10 to users of cellular phones 100 or personal computers 50 while keeping this format.

In the following description, the expression "{Y}X" represents that data Y is encrypted to allow decryption with a decryption key X.

Together with the encrypted content data, distribution server 10 distributes additional information Dc-inf, which is plaintext information relating, e.g., to copyright of the content data or server access. As licenses, license key Kc as well as a license ID, a content ID, access control information ACm, reproduction control information ACp and others are present. The license ID is a code for administering or managing the distribution of the license from distribution server 10 and identifying the license. The content ID is a code for identifying content data Dc and license key Kc. Access control information ACm is information relating to restriction on access to the license in the recording device (i.e., memory card or license-dedicated memory card). Reproduction control information ACp is control information relating to reproduction in the content reproducing circuit. More specifically, access control information ACm is the control information for externally outputting the license or license key from the memory card or the license-dedicated memory card, and includes a reproducible frequency (allowed times of output of the license key for reproduction) as well as restriction information relating to the shift/copy of the licenses. Reproduction control information ACp is used for restricting the reproduction after the content reproducing circuit receives the license key for reproduction, and relates to the reproduction period, restriction on change in reproduction speed, reproduction range designation (partial license) and others.

In the following description, the license ID, content ID, license key Kc, access control information ACm and reproduction control information ACp will be collectively referred to as the license.

For the sake of simplicity, access control information ACm in the following description relates to only two items, i.e., the usage count (0: reproduction is inhibited, 1-254: allowed reproduction number, 255: no limit), which is the control information for restricting the reproduction time(s), and the shift/copy flag (0: shift/copy are inhibited, 1: only shift is allowed, 2: shift/copy are allowed), which can restrict the shift and/or copy of the license. Likewise, reproduction control information ACp restricts only the reproduction period (UTC time code), which is the control information specifying the period allowing reproduction.

According to the embodiment of the invention, a validity flag indicating validity/invalidity of the license held in the recording device on the sender side is operated when the license is shifted or copied from the recording device (memory card or license-dedicated memory card) on the sender side to the recording device on the receiver side. When the validity flag is valid, this means that the license can be externally provided from the memory card. When the validity flag is invalid, this means that the license cannot be externally provided.

FIG. 4 illustrates characteristics of data, information and others for certification, which are used in the data distribution systems shown in FIGS. 1 and 2.

Each of the content reproducing circuit, memory card and license-dedicated memory card in the data reproduction terminals is provided with an individual public encryption keys KPpy and KPmw. Public encryption key KPpy can be decrypted with a private decryption key Kpy peculiar to the content reproducing circuit. Public encryption key KPmw can be decrypted with a private decryption key Kmw peculiar to the memory card or the license-dedicated memory card. These public encryption keys and private decryption keys have values, which depend on the types of the memory card and license-dedicated memory card. These public encryption keys and private decryption keys are collectively referred to as class keys. The public encryption keys are referred to as the class public encryption keys, the private decryption keys are referred to as the class private decryption keys. The unit, in which the class key is commonly used, is referred to as the class. The class depends on a manufacturer, a kind of the product, a production lot and others.

Cpy is employed as a class certificate of the content reproducing circuit. Cmw is employed as a class certificate of each of the memory card and the license-dedicated memory card. These class certificates have information depending on the classes of the content reproducing circuit, memory card and license-dedicated memory card.

The class public encryption key and the class certificate of the content reproducing circuit are recorded as certification data {KPpy//Cpy}KPa in the data reproducing circuit at the time of shipment. The class public encryption key and the class certificate of the memory card or the license-dedicated memory card are recorded as certification data {KPmw//Cmw}KPa in the memory card or the license-dedicated memory card at the time of shipment. As will be described later in greater detail, KPa is a public certification key symmetric in the whole distribution system.

The keys for administering data processing in memory card 110 and the license-dedicated memory card include a public encryption key KPmc, which is set for each of the mediums such as a memory card and a license-dedicated memory card, and also include a private decryption key Kmcx, which is peculiar to each medium and allows decryption of data encrypted with a public encryption key KPmcx. The public encryption key and the private decryption key, which are peculiar to each of the memory card and the license-dedicated memory card, will be collectively referred to as "individual keys". Public encryption key KPmcx will be referred to as an "individual public encryption key", and private decryption key Kmcx will be referred to as an "individual private decryption key".

Symmetric keys Ks1-Ks3, which are generated in distribution server 10, cellular phone 100, memory card 110 and the license-dedicated memory card, are used every time the license is distributed, shifted, copied or reproduced.

Symmetric keys Ks1-Ks3 are peculiar symmetric keys, which are generated for each "session", i.e., the unit of access or communication between the distribution server and the content reproducing circuit, memory card or license-dedicated memory card. These symmetric keys Ks1-Ks3 will be referred to as "session keys", hereinafter.

These session keys Ks1-Ks3 have values peculiar to each session, and thereby are administered by the distribution server, content reproducing circuit, memory card and license-dedicated memory card. More specifically, session key Ks1 is generated for each distribution session by the distribution server. Session key Ks2 is generated for each of distribution session and reproduction session of the memory card and the license-dedicated memory card. Session key Ks3 is generated for each reproduction session in the content reproducing circuit. The level of security can be improved in each session by transmitting these session keys, receiving the session key generated by another device to perform encryption using the received session key and transmitting the license key and others.

FIG. 5 is a schematic block diagram showing a structure of distribution server 10 shown in FIGS. 1 and 2.

Distribution server 10 includes an information database 304 storing content data encrypted according to a predetermined manner as well as distribution information such as a content ID, an account database 302 holding accounting information according to the start of access to content data for each of the users of the cellular phones and personal computers, a menu database 307 holding the menu of content data held in information database 304, a distribution log database 308 produced in response to every distribution of the license for holding a log relating to distribution of the license ID specifying the license and others, a data processing unit 310 receiving data via a bus BS1 from information database 304, account database 302, menu database 307 and distribution log database 308, and performing predetermined processing, and a communication device 350 transmitting data between distribution carrier 20 and data processing unit 310 over the communication network.

Data processing unit 310 includes a distribution control unit 315 controlling an operation of data processing unit 310 in accordance with the data on bus BS1, a session key generating unit 316 which is controlled by distribution control unit 315 to generate session key Ks1 in the distribution session, a certification key holding unit 313 holding public certification key KPa for decrypting certification data {KPmw//Cmw}KPa sent for certification from the memory card or the license-dedicated memory card, a decryption processing unit 312 receiving certification data {KPmw//Cmw}KPa, which is sent for certification from the memory card or license-dedicated memory card, via communication device 350 and bus BS1, and decrypting it with public certification key KPa sent from certification key holding unit 313, session key generating unit 316 generating session key Ks1, an encryption processing unit 318 which encrypts session key Ks1 produced by session key generating unit 316 with class public encryption key KPmw obtained by decryption processing unit 312, and provides it onto bus BS1, and a decryption processing unit 320 receiving and decrypting the data, which is sent after being encrypted with session key Ks1, with session key Ks1.

Data processing unit 310 further includes an encryption processing unit 326 encrypting license key Kc and access control information ACm, which are provided from distribution control unit 315, with public encryption key KPmcx, which is obtained by decryption processing unit 320 and is peculiar to each of the memory card and license-dedicated memory card, as well as an encryption processing unit 328 further encrypting the output of encryption processing unit 326 with a session key Ks2 provided from decryption processing unit 320, and outputting it onto bus BS1.

Operations in the distribution session of distribution server 10 will be described later in greater detail with reference to flowcharts.

Figure 6:
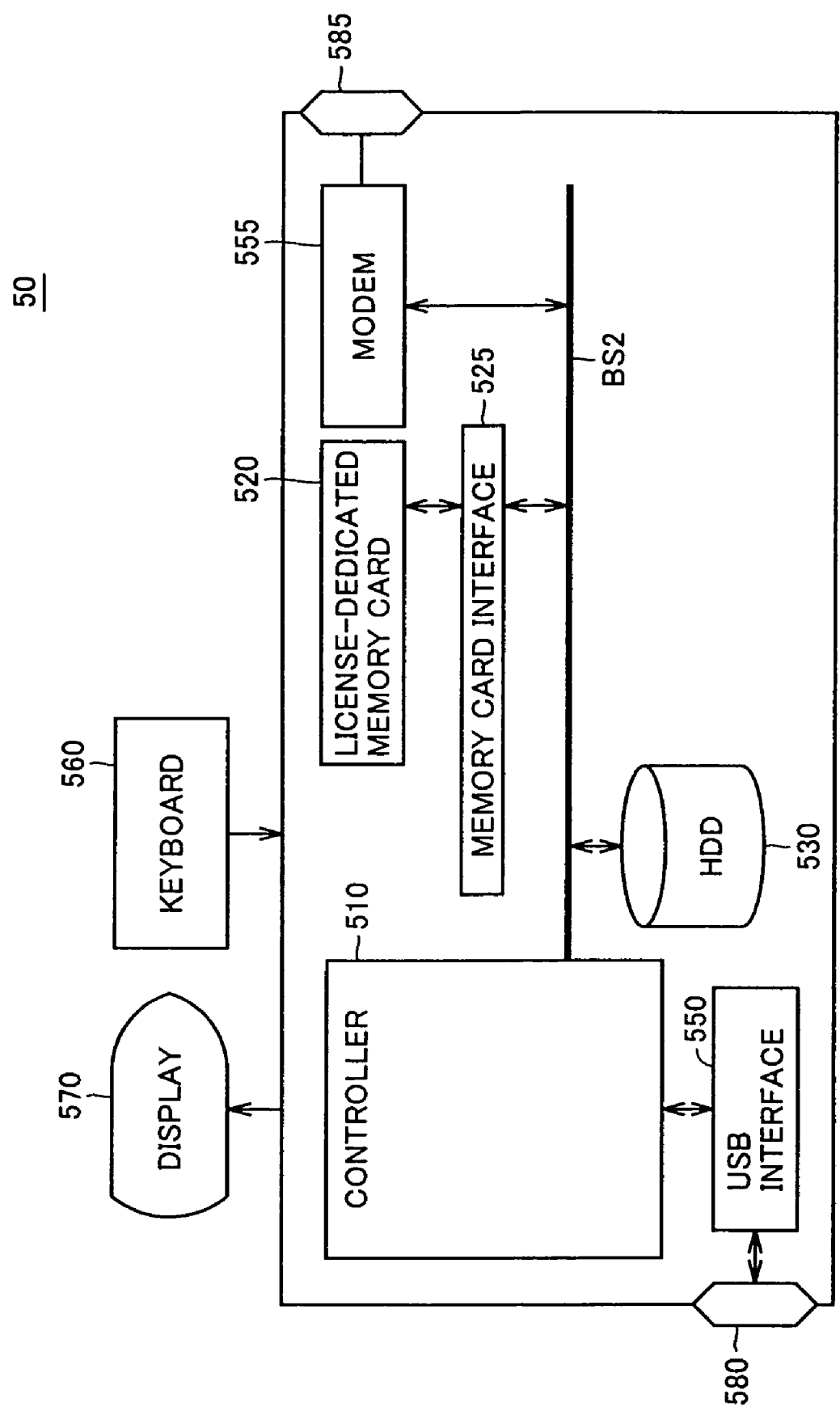
FIG. 6 is a schematic block diagram showing a structure of a personal computer in the data distribution systems shown in FIGS. 1 and 2.

FIG. 6 is a schematic block diagram showing a structure of personal computer 50 shown in FIGS. 1 and 2. Personal computer 50 includes a bus BS2 for data transmission to and from various units in personal computer 50, and a controller (CPU) 510 internally controlling personal computer 50 and executing various programs. Personal computer 50 also includes a hard disk (HDD) 530, which are large-capacity storage devices connected to bus BS2 for recording or storing programs and/or data, as well as a keyboard 560 for entering user's instructions and a display 570 visually providing various kinds of information to users.

Personal computer 50 further includes a USB (Universal Serial Bus) interface 550 controlling transmission of data between controller 510 and a terminal 580 during transmission of the encrypted content data and the license to or from cellular phone 100 or the like, terminal 580 for connecting dedicated cable 65 or a USB cable 75, a modem 555 controlling the data transmission between controller 510 and a terminal 585 during communication with distribution server 10 over Internet network 30, and terminal 585 for connection to Internet network 30.

Controller 510 controls the transmission of data to and from distribution server 10 for receiving by a license-dedicated memory card 520 the encrypted content data and others from distribution server 10 over Internet network 30. Further, personal computer 50 includes license-dedicated memory card 520, which operates to send and receive various keys to and from distribution server 10 for receiving the encrypted content data and the license from distribution server 10, and also operates to administer, by hardware, the license used for reproducing the encrypted content data thus received, and a memory card interface 525 for sending and receiving the data between bus BS2 and license-dedicated memory card 520.

License-dedicated memory card 520 operates, by hardware, to send and receive the data for receiving the encrypted content data and the license from distribution server 10, and to manage the received license.

As described above, personal computer 50 is internally provided with license-dedicated memory card 520 for receiving the encrypted content data and the license from distribution server 10 over Internet network 30, and for storing the license saved from memory card 110.

Figure 7:
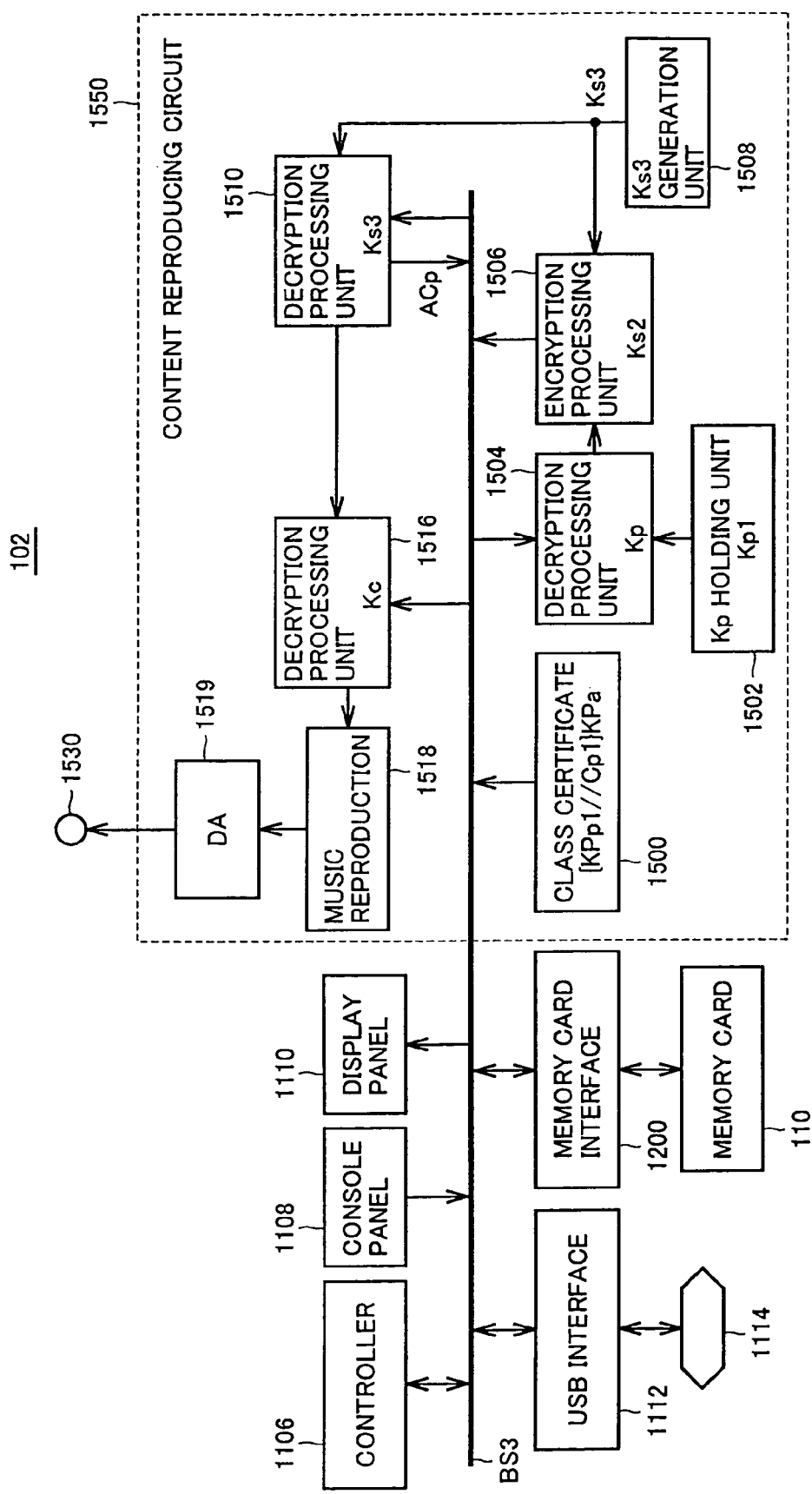
FIG. 7 is a schematic block diagram showing a structure of a reproduction terminal in the data distribution system shown in FIG. 2.

FIG. 7 is a schematic block diagram showing a structure of reproduction terminal 102 shown in FIG. 2.

Reproduction terminal 102 includes a bus BS3 for data transmission to and from various units in reproduction terminal 102, a controller 1106 controlling the operation of reproduction terminal 102 via bus BS3, a console panel 1108 for externally applying instructions to reproduction terminal 102, and a display panel 1110 visually providing information sent from controller 1106 and others to the user.

Reproduction terminal 102 further includes removable memory card 110 for storing and decrypting the content data (music data) sent from distribution server 10, a memory card interface 1200 controlling transmission of data between memory card 110 and bus BS3, a USB interface 1112 controlling data transmission between bus BS3 and a terminal 1114 when receiving the encrypted content data and the license from personal computer 50, and terminal 1114 for connecting USB cable 75.

Reproduction terminal 102 further includes a certification data holding unit 1500 holding certification data {KPp1// Cp1}KPa, which is prepared by encrypting class public encryption key KPp1 and class certificate Cp1, and can be decrypted with public certification key KPa to verify its validity. A class y of reproduction terminal 102 is equal to one (y=1).

Reproduction terminal 102 further includes a Kp holding unit 1502 holding Kp 1, which is a decryption key peculiar to the class, and a decryption processing unit 1504, which decrypts the data received from bus BS3 with decryption key Kp1 to obtain session key Ks2 generated by memory card 110.

Reproduction terminal 102 further includes a session key generating unit 1508 generating a session key Ks3, e.g., based on a random number for encrypting the data to be transmitted to and from memory card 110 via bus BS3 in the reproduction session, which is performed for reproducing the content data stored in memory card 110, and an encryption processing unit 1506, which encrypts session key Ks3 generated by session key generating unit 1508 with session key Ks2 obtained by decryption processing unit 1504, and provides it onto bus BS3 when receiving license key Kc and reproduction control information ACp from memory card 110 in the reproduction session of the encrypted content data.

Reproduction terminal 102 further includes a decryption processing unit 1510, which decrypts the data on bus BS3 with session key Ks3 to provide license key Kc and reproduction control information ACP, and a decryption processing unit 1516, which receives encrypted content data {Dc}Kc from bus BS3, decrypts it with license key Kc supplied from decryption processing unit 1510, and provides content data Dc to a music reproducing unit 1518.

Reproduction terminal 102 further includes a music reproducing unit 1518 receiving the output of decryption processing unit 1516 and reproducing the content data, a D/A converter 1519 converting the output of music reproducing unit 1518 from digital signals into analog signals, and a terminal 1530 for providing the output of D/A converter 1519 to an external output device (not shown) such as headphones.

In FIG. 7, a region surrounded by dotted line provides a content reproducing circuit 1550 reproducing the music data by decrypting the encrypted content data.

Cellular phone 100 shown in FIG. 1 has a function of receiving distribution of the encrypted content data or the license from distribution server 10 over the cellular phone network. Accordingly, the structure of cellular phone 100 shown in FIG. 1 corresponds to the structure shown in FIG. 7 except for that cellular phone 100 additionally has structures, which are to be originally employed as the cellular phone, such as a an antenna for receiving radio signals sent over the cellular phone network, a transmission unit for converting the signals received from the antenna into baseband signals and for sending data provided from the cellular phone to the antenna after modulating it, a microphone, a speaker and an audio coder-decoder. Further, cellular phone 100 includes a dedicated interface and a dedicated terminal instead of USB interface 1112 and terminal 1114.

Operations in respective sessions of the respective components of cellular phone 100 and reproduction terminal 102 will be described later in greater detail with reference to flowcharts.

Figure 8:
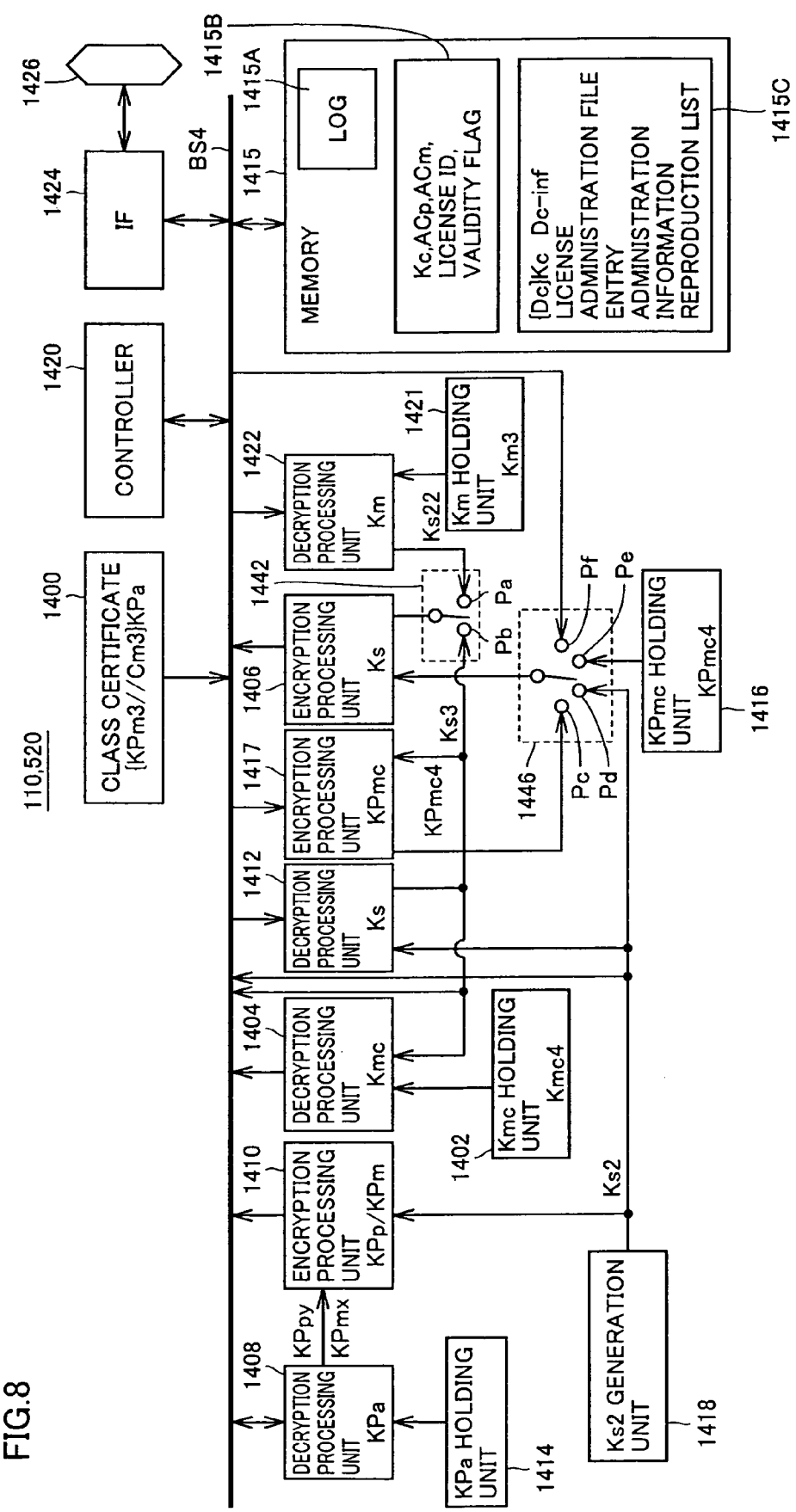
FIG. 8 is a schematic block diagram showing a structure of a memory card in the data distribution systems shown in FIGS. 1 and 2.

FIG. 8 is a schematic block diagram showing a structure of memory card 110 shown in FIGS. 1 and 2.

As already described, KPmw and Kmw are employed as the class public encryption key and the class private decryption key of the memory card, respectively, and class certificate Cmw of the memory card is also employed. It is assumed that the natural number w is equal to three in memory card 110 (w=3). The natural number x for identifying the memory card is equal to four (x=4).

Accordingly, memory card 110 includes a certification data holding unit 1400 holding certification data {KPm3// Cm3}KPa, a Kmc holding unit 1402 holding an individual private decryption key Kmc4, which is a decryption key peculiar to each memory card, a Km holding unit 1421 holding a class private decryption key Km3 and a KPmc holding unit 1416 holding a public encryption key KPmc4, which can be decrypted with individual private decryption key Kmc4.

Owing to provision of the encryption key of the memory card operating as the record device, the distributed content data and the encrypted license key can be administered for each memory card independently of the other memory cards, as will be apparent from the following description.

Memory card 110 further includes an interface 1424 transmitting signals to and from memory card interface 1200 via a terminal 1426, a bus BS4 transmitting signals to and from interface 1424, a decryption processing unit 1422, which decrypts data applied onto bus BS4 via interface 1424 with class private decryption key Km3 received from Km holding unit 1421, and provides session key Ks1 generated in the distribution session by distribution server 10 to a contact Pa, a decryption processing unit 1408, which receives public certification key KPa from a KPa holding unit 1414, decrypts the data provided onto bus BS4 with public certification key KPa, sends the result of decryption and the class certificate obtained thereby to a controller 1420 and sends the class public key obtained thereby to an encryption processing unit 1410, and an encryption processing unit 1406, which encrypts the data selectively provided from a selector switch 1446 with a key selectively provided from a selector switch 1442, and provides it onto bus BS4.

Memory card 110 further includes a session key generating unit 1418 generating session key Ks2 in each of the distribution and reproduction sessions, encryption processing unit 1410, which encrypts session key Ks2 sent from session key generating unit 1418 with class public encryption key KPpy or KPmw obtained by decryption processing unit 1408, and sends it onto bus BS4, a decryption processing unit 1412, which receives the data encrypted with session key Ks2 from bus BS4, and decrypts it with session key Ks2 obtained from session key generating unit 1418, and an encryption processing unit 1417 encrypting license key Kc and reproduction control information ACp, which are read from memory 1415 in the reproduction session of the encrypted content data, with individual public encryption key KPmcx (x≠4) of another memory card, which is decrypted by decryption processing unit 1412.

Memory card 110 further includes a decryption processing unit 1404 decrypting the data on bus BS4 with an individual private decryption key Kmc4 of memory card 110, which is paired with individual public encryption key KPmc4, and a memory 1415 receiving, from bus BS4, and storing a log storing a history of communication with distribution server 10 and other memory cards, encrypted content data {Dc}Kc, a license (Kc, ACp, ACm, license ID and content ID) for reproducing encrypted content data {Dc}Kc, additional information Dc-inf, the reproduction list of the encrypted content data, and the license administration file for administering the license. Memory 1415 is formed of, e.g., a semiconductor memory. Memory 1415 is formed of a log region 1415A, a license region 1415B and a data region 1415C. Log region 1415A is a region for recording the log. Log region 1415A includes a receive log, which is recorded when memory card 110 receives and stores the license, and a send log, which is recorded when memory card 110 provides the license to another memory card. Further, the receive log includes a "receive state" having two states of ON and OFF. The receive log and the send log will be described later in greater detail.

License region 1415B is used for recording the license. License region 1415B stores the license and the validity flag in record units, each of which is dedicated to the license and is called "entry", for recording the license (license key Kc, reproduction control information ACp, access control information ACm, license ID and content ID) and the validity flag. For accessing the license, an entry number is used for designating the entry, in which the license is stored or is to be recorded.

Data region 1415C is used for recording encrypted content data {Dc}Kc, information Dc-inf related to encrypted content data {Dc}Kc, the license administration file recording information required for license administration for each encrypted content data, a reproduction list recording basic information for accessing the encrypted content data and the license recorded in the memory card, and the entry information for administering the entries in license region 1415B. Data region 1415C can be externally and directly accessed. The license administration file and the reproduction list will be described later in greater detail.

Memory card 110 further includes controller 1420, which externally transmits data via bus BS4, and receives access control information ACm and others from bus BS4 for controlling operations of memory card 110.

All the structures except for data region 1415C are formed in an anti-tamper module region.

License-dedicated memory card 520 shown in FIG. 6 has the same structure as memory card 110. However, license-dedicated memory card 520 records only the entry administration information in data region 1415C of memory 1415. The natural number w of license-dedicated memory card 520 takes a value other than three, and the natural number x identifying license-dedicated memory card 520 takes a value other than four.

Description will now be given on operations in the respective sessions of the data distribution systems shown in FIGS. 1 and 2.

[Distribution]

First, description will be given on the operation of distributing the encrypted content data and the license from distribution server 10 to memory card 110 of cellular phone 100 in the data distribution system shown in FIG. 1.

Figure 9:
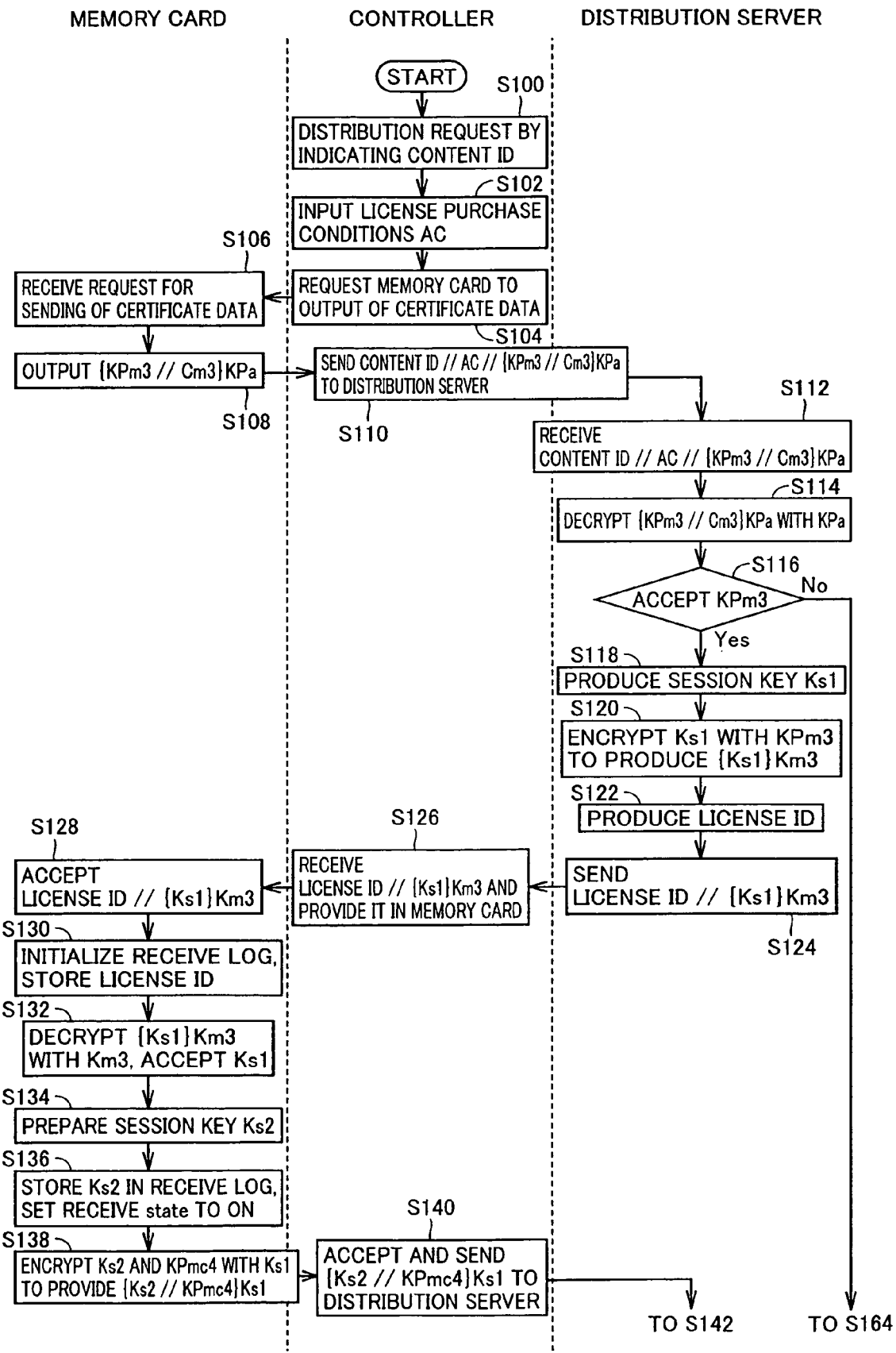
FIG. 9 is a first flowchart illustrating a distributing operation in the data distribution systems shown in FIGS. 1 and 2.
Figure 10:
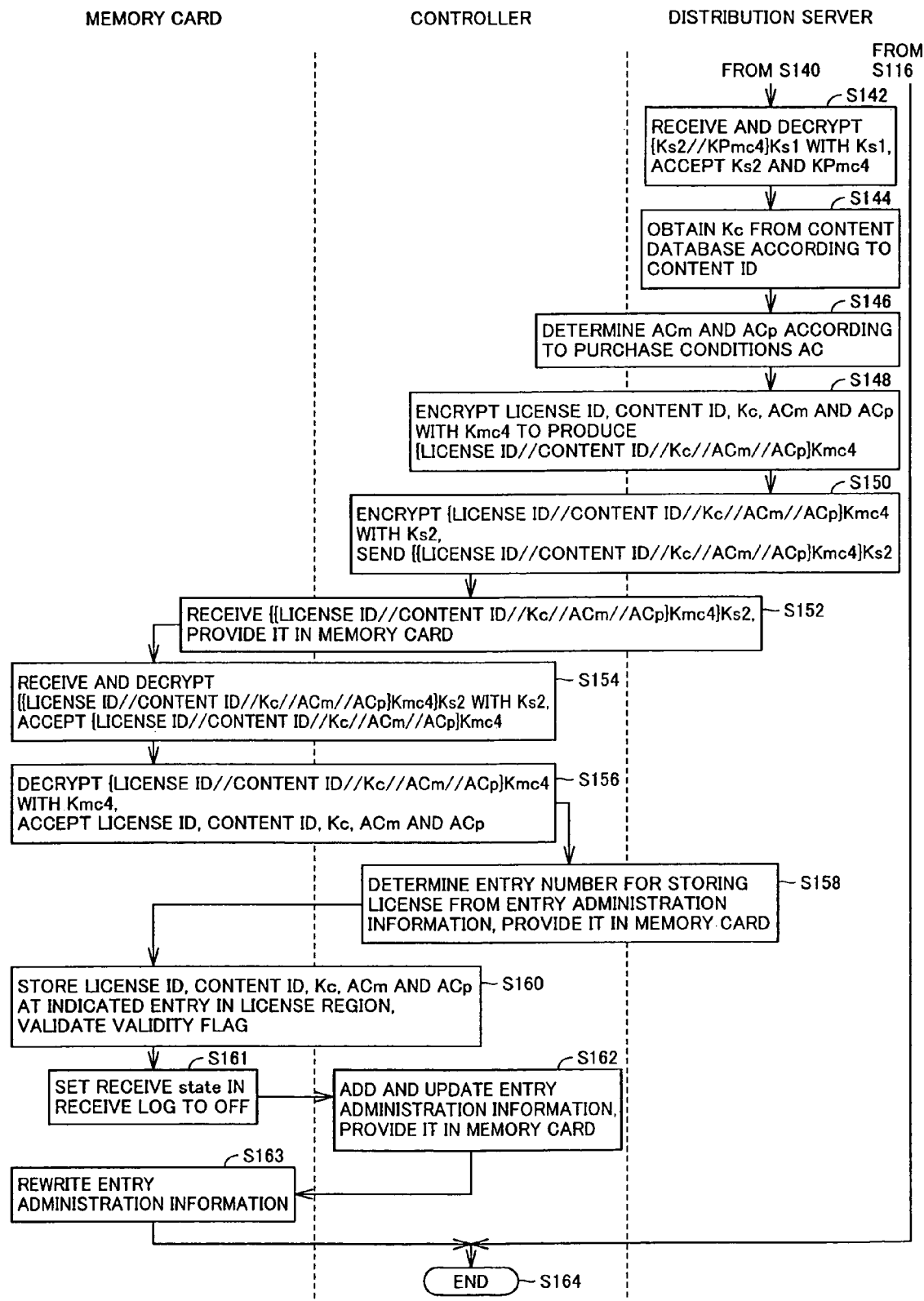
FIG. 10 is a second flowchart illustrating the distributing operation in the data distribution systems shown in FIGS. 1 and 2.

FIGS. 9 and 10 are first and second flowcharts for illustrating the operation of distributing the license to memory card 110 attached to cellular phone 100. This operation is performed when purchasing the encrypted content data in the data distribution system shown in FIG. 1, and will be referred to as a "distribution session" hereinafter.

Before the processing illustrated in FIG. 9, the user connects cellular phone 100 to distribution server 10 over the cellular phone network, and obtains the content ID for the intended content to be purchased. Further, the user obtains the entry administration information for memory card 110, and confirms the empty entry in license region 1415B. The following description is based on the premise that the above operations are already performed.

Referring to FIG. 9, the user of cellular phone 100 requests the distribution via console panel 1108 by designating the content ID (step S100). Through console panel 1108, the user of cellular phone 100 instructs the entry of purchase conditions AC for purchasing the license of the encrypted content data, and purchase conditions AC are entered (step S102). More specifically, access control information ACm and reproduction control information ACp of the encrypted content data are set, and purchase conditions AC are entered for purchasing license key Kc decrypting the encrypted content data selected by the user.

When purchase conditions AC of the encrypted content data are input, controller 1106 provides the instruction to provide the certification data via bus BS3 and memory card interface 1200 to memory card 110 (step S104). Controller 1420 of memory card 110 receives the request for sending the certification data via terminal 1426, interface 1424 and bus BS4 (step S106). Controller 1420 reads out certification data {KPm3//Cm3}KPa from certification data holding unit 1400 via bus BS4, and provides certification data {KPm3//Cm3}KPa via bus BS4, interface 1424 and terminal 1426 (step S108).

In addition to certification data {KPm3//Cm3}KPa sent from memory card 110, controller 1106 of cellular phone 100 sends the content ID, data AC of license purchase conditions and the distribution request to distribution server 10 (step S110).

Distribution server 10 receives the distribution request, content ID, certification data {KPm3//Cm3}KPa and data AC of license purchase conditions from cellular phone 100 (step S112), and decryption processing unit 312 decrypts the certification data {KPm3//Cm3}KPa provided from cellular phone 100 with public certification key KPa (step S114).

Distribution control unit 315 performs certification processing based on the result of decryption by decryption processing unit 312, and more specifically, determines whether it receives the encrypted certification data for verifying its validity by a regular authority or not (step S116). When it is determined that the certification data is the valid data, distribution control unit 315 approves and accepts class public encryption key KPm3 and class certificate Cm3. Then, the processing moves to a step S118. When distribution control unit 315 determines that it is not the valid certification data, the data is not approved, and the processing ends without accepting class public encryption key KPm3 and class certificate Cm3 (step S164).

When it is determined from the result of certification that the access is made from the cellular phone equipped with the memory card having valid certification data, session key generating unit 316 in distribution server 10 produces session key Ks1 for distribution (step S118). Session key Ks1 is encrypted by encryption processing unit 318 with class public encryption key KPm3 corresponding to memory card 110 and obtained by decryption processing unit 312 (step S120).

Distribution control unit 315 produces license ID (step S122), and license ID and encrypted session key Ks1 are sent as license ID//{Ks1}Km3 to cellular phone 100 via bus BS1 and communication device 350 (step S124).

When cellular phone 100 receives license ID//{Ks1}Km3, controller 1106 provides license ID//{Ks1}Km3 to memory card 110 (step S126). In memory card 110, thereby, controller 1420 accepts license ID//{Ks1}Km3 via terminal 1426 and interface 1424 (step S128). Controller 1420 initializes the receive log recorded in log region 1415A of memory 1415 via bus BS4, and stores the accepted license ID in log region 1415A (step S130). At this time, the receive state is set to OFF. Thereafter, controller 1420 provides encrypted data {Ks1}Km3 to decryption processing unit 1422 via bus BS4, and decryption processing unit 1422 decrypts it with class private decryption key Km3, which is peculiar to memory card 110 held in Km holding unit 1421, so that session key Ks1 is decrypted and accepted (step S132).

When confirming the acceptance of session key Ks1 generated by distribution server 10, controller 1420 instructs session key generating unit 1418 to produce session key Ks2 to be produced at the time of distribution operation in memory card 110. Session key generating unit 1418 produces session key Ks2 (step S134). Controller 1420 receives session key Ks2 thus produced via bus BS4, stores received session key Ks2 in log region 1415A of memory 1415, and sets the receive state to ON (step S136).

Encryption processing unit 1406 encrypts session key Ks2 and individual public encryption key KPmc4, which are obtained by successively selecting the contacts of selector switch 1446, with session key Ks1, which is provided by decryption processing unit 1422 via contact Pa of selector switch 1442, and thereby produces one data row, i.e., encrypted data {Ks2//KPmc4}Ks1 for providing it onto bus BS4. Encrypted data {Ks2//KPmc4}Ks1 provided onto bus BS4 is then provided to cellular phone 100 from bus BS4 via interface 1424 and terminal 1426 (step S138), and is sent from cellular phone 100 to distribution server 10 (step S140).

Referring to FIG. 10, distribution server 10 receives encrypted data {Ks2//KPmc4}Ks1, decrypts it with session key Ks1 by decryption processing unit 320, and accepts session key Ks2 produced by memory card 110 as well as individual public encryption key KPmc4 of memory card 110 (step S142).

Distribution control unit 315 obtains license key Kc from information database 304 in accordance with content ID obtained in step S112 (step S144), and determines the access control information ACm and reproduction control information ACp in accordance with the license purchase conditions AC obtained in step S112 (step S146).

Distribution control unit 315 provides the produced licenses, i.e., license ID, content ID, license key Kc, reproduction control information ACp and access control information ACm to encryption processing unit 326. Encryption processing unit 326 encrypts the license with individual public encryption key KPmc4 of memory card 110 obtained by decryption processing unit 320 to produce encrypted data {license ID//content ID//Kc//ACm//ACp}Kmc4 (step S148). Encryption processing unit 328 encrypts encrypted data {license ID//content ID//Kc//ACm//ACp}Kmc4 provided from encryption processing unit 326 with session key Ks2 provided from decryption processing unit 320, and provides encrypted data {{license ID//content ID//Kc//ACm//ACp}Kmc4}Ks2. Distribution control unit 315 sends encrypted data {{license ID//content ID//Kc//ACm//ACp}Kmc4}Ks2 to cellular phone 100 via bus BS1 and communication device 350 (step S150).

Cellular phone 100 receives encrypted data {{license ID//content ID//Kc//ACm//ACp}Kmc4}Ks2 sent thereto, and provides it via bus BS3 and memory card interface 1200 to memory card 110 (step S152). In memory card 110, decryption processing unit 1412 decrypts the received data provided onto bus BS4 via terminal 1426 and interface 1424. Decryption processing unit 1412 decrypts the received data on bus BS4 with session key Ks2, which is provided from session key generating unit 1418, and provides it onto bus BS4 (step S154).

In this stage, bus BS4 receives encrypted license {license ID//content ID//Kc//ACm//ACp}Kmc4, which can be decrypted with individual private decryption key Kmc4 held on Kmc holding unit 1402 (step S154).

Controller 1420 instructs decryption processing unit 1404 to decrypt encrypted data {license ID//content ID//Kc//ACm//ACp}Kmc4 with individual private decryption key Kmc4, and license (license key Kc, license ID, content ID, access control information ACm and reproduction control information ACp) is accepted (step S156).

Controller 1106 of cellular phone 100 determines the entry number for storing the license received from distribution server 10 based on the entry administration information read from memory 1415 of memory card 110, and provides the determined entry number to memory card 110 via bus BS3 and memory card interface 1200 (step S158).

Thereby, controller 1420 of memory card 110 receives the entry number via terminal 1426 and interface 1424, stores licenses (license key Kc, license ID, content ID, access control information ACm and reproduction control information ACp), which is obtained in step S156, in license region 1415B of memory 1415 designated by the received entry number, and validates the validity flag in the same entry (step S160). Then, controller 1420 sets the receive state, which is recorded in the receive log of log region 1415A in memory 1415, to OFF via bus BS4 (step S161). When the writing of license ends, controller 1106 updates the entry administration information to indicate that the entry of the number provided to memory card 110 in step S158 is being used, and provides the updated entry administration information to memory card 110 (step S162). Controller 1420 of memory card 110 rewrites the entry administration information in data region 1415C of memory 1415 with the provided entry administration information (step S163). Thereby, the license distributing operation ends (step S164).

After the end of the license distributing session, controller 1106 of cellular phone 100 sends the request for distribution of the encrypted content data to distribution server 10. Distribution server 10 receives the request for distribution of the encrypted content data. Distribution control unit 315 of distribution server 10 obtains encrypted content data {Dc}Kc and additional information Dc-inf from information database 304, and sends these data and information via bus BS1 and communication device 350 to cellular phone 100.

Cellular phone 100 receives data {Dc}Kc//Dc-inf, and accepts encrypted content data {Dc}Kc and additional information Dc-inf. Thereby, controller 1106 provides encrypted content data {Dc}Kc and additional information Dc-inf as one content file to memory card 110 via bus BS3 and memory card interface 1200. Also, controller 1106 produces the license administration file, which includes the entry number of the license stored in memory card 110 as well as plaintext of license ID and content ID, for encrypted content data {Dc}Kc and additional information Dc-inf, and provides the license administration file thus produced to memory card 110 via bus BS3 and memory card interface 1200. Further, controller 1106 adds the accepted content information to the content list recorded in memory 1415 of memory card 110, and more specifically, adds names of the recorded content file and license administration file as well as information (title of tune and name of artist), which relates to the encrypted content data and is extracted from additional information Dc-inf. Thereby, the whole processing ends.

As described above, it is determined that memory card 110 attached to cellular phone 100 is the device holding the regular or valid certification data, and at the same time, it is determined that public encryption key KPm3, which can be encrypted and sent together with class certificate Cm3, is valid. After determining these facts, the content data can be distributed so that it is possible to inhibit the distribution of the content data to the unauthorized memory card.

The encryption keys produced in the distribution server and the memory card are transmitted between them. Each of the distribution server and the memory card executes the encryption with the received encryption key, and sends the encrypted data to the other so that the mutual certification can be practically performed even when sending and receiving the encrypted data, and it is possible to improve the security in the data distribution system.

Further, memory card 110 receives the encrypted content data and the license from distribution server 10 by transmitting data to and from distribution server 10 in a hardware fashion, and stores the license for reproducing the encrypted content data in a hardware fashion so that memory card 110 can have a high security level.

The operation of distributing the license to license-dedicated memory card 520 shown in FIG. 6 is performed in accordance with the flowcharts of FIGS. 9 and 10. The operation of distributing the encrypted content data to license-dedicated memory card 520 is performed in the same manner as that already described. Only the difference is that cellular phone 100 and memory card 110 in the foregoing description are replaced with personal computer 50 and license-dedicated memory card 520, respectively.

In the operation of distributing the encrypted content data and the license to license-dedicated memory card 520, the encrypted content data and the license are likewise received and stored in a hardware fashion. Therefore, the distribution of the encrypted content data and the license to license-dedicated memory card 520 can be performed at a high security level, as can also be done in the distribution of the encrypted content data and the license to memory card 110.

Figure 11:
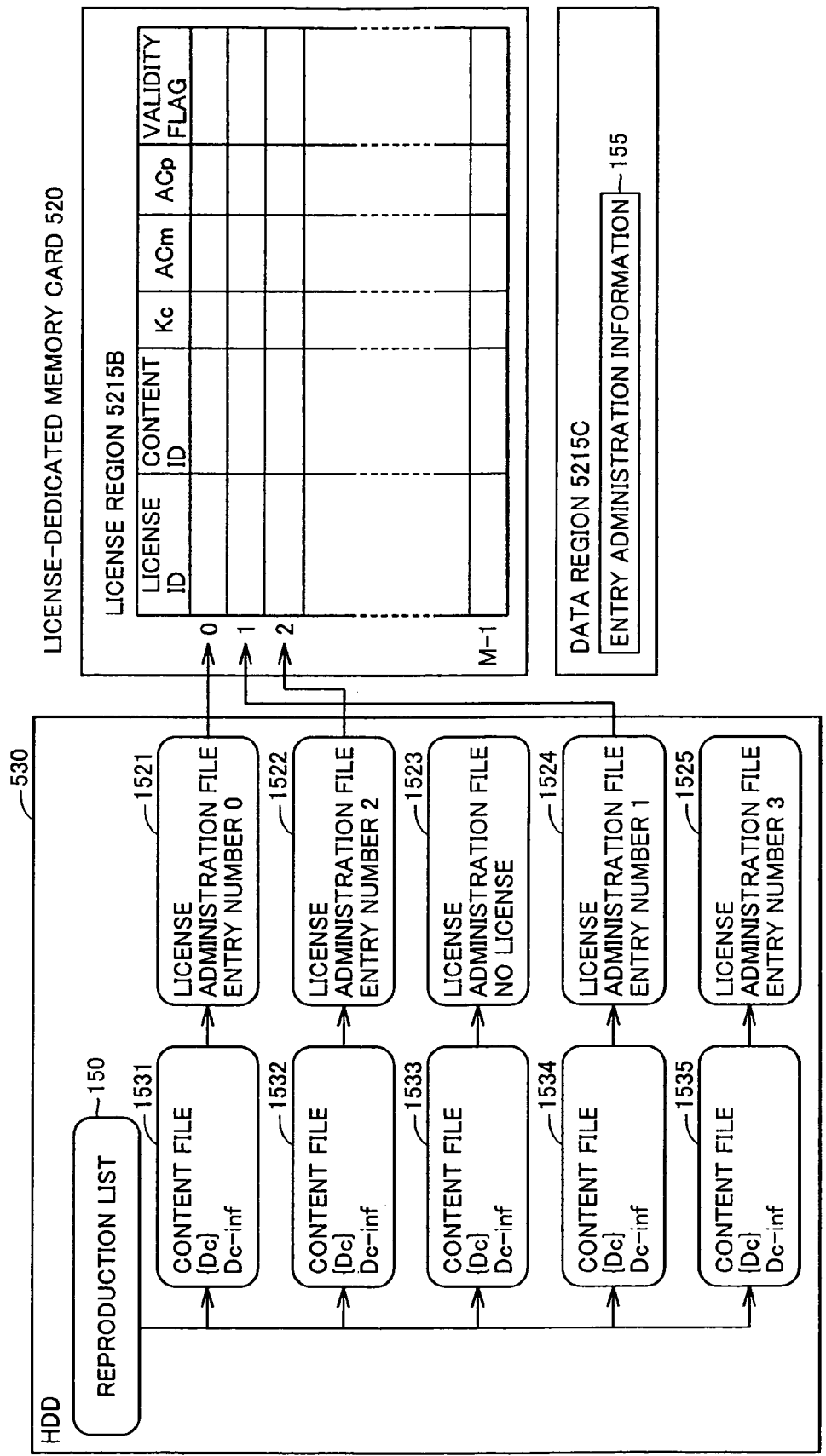
FIG. 11 illustrates a structure of a content list file in a hard disk of a personal computer.

Referring to FIG. 11, description will now be given on the administration of the encrypted content data and the license received by license-dedicated memory card 520 of personal computer 50. Hard disk 530 of personal computer 50 includes a reproduction list 150, content files 1531-1535 and license administration files 1521-1525.

Reproduction list 150 is a data file of owned contents in a list format, and includes information (e.g., title of tune and name of artist) for each content as well as information (file names) representing the content files and license administration files. Information for each content is mentioned automatically by obtaining necessary information from additional information Dc-inf at the time of reception of the content, or is mentioned in accordance with the instruction by the user. The contents, which include only the content file or license administration file, and thus cannot be reproduced, can be administered in the list.

Content files 1531-1535 are files storing encrypted content data {Dc}Kc and additional information Dc-inf, which are received by license-dedicated memory card 520, and are provided for the respective contents.

License administration files 1521-1525 are recorded corresponding to content files 1531-1535, respectively, and are employed for administering the licenses received and recorded in license-dedicated memory card 520. As can be seen from the description already given, it is usually impossible to refer to the licenses, and information other than license key Kc does not cause a problem relating to the copyright protection only if rewriting by the user is inhibited. However, if license key Kc and the other information were administered separately or independently of each other when operating the system, this would lower the security level. Accordingly, in the case of receiving the distributed licenses, the license ID and content ID, which can be referred in the form of plaintext, as well as copies of matters, which are restricted by access control information ACm and reproduction control information ACp, and can be easily determined from license purchase conditions AC, are recorded in the form of plaintext. When the license is recorded in license-dedicated memory card 520, the entry number is recorded. A license region 525B of a memory 5215 in license-dedicated memory card 520 is a record region formed of an anti-tamper module recording the license at a high security level. Entries of M in number are provided for recording the license (license key Kc, reproduction control information ACp, access control information ACm and license ID).

License administration files 1521, 1524, 1522 and 1525 include entry numbers "0", "1", "2" and "3", respectively. These are received by license-dedicated memory card 520, and designate the administration regions of the license (license ID, license key Kc, access control information ACm and reproduction control information ACp) administered in a license region 5215B in memory 5215 of license-dedicated memory card 520.

For shifting the encrypted content data of the file name recorded in content file 1531 to cellular phone 100 or memory card 110 attached to reproduction terminal 102, content files 1531-1535 are retrieved to extract content file 1531 so that the place where the license for reproducing the encrypted content data can be determined. Since license administration file 1521 corresponding to content file 1531 includes the entry number "0", the license for reproducing the encrypted content data of the file name recorded in content file 1531 is recorded in the region, which is designated by the entry number "0", of license region 5215B in memory 5215 of license-dedicated memory card 520. Thereby, the entry number "0" is read from license administration file 1521 of reproduction list file 150 recorded on hard disk 530, and the entry number "0" thus read is provided to license-dedicated memory card 520. Thereby, the license can be easily taken out from license region 5215B of memory 5215, and can be shifted to memory card 110. After shifting the license, the validity flag at the entry number designated in license region 5215B of memory 5215 becomes invalid, and correspondingly, "no license" is recorded, as can be seen in license administration file 1523.

License administration file 1523 includes "no license". This results from the fact that the license received by license-dedicated memory card 520 is shifted to the memory card or another license-dedicated memory card. Corresponding content file 1533 is still recorded on hard disk 530. For shifting the license from a memory card or another license-dedicated memory card to license-dedicated memory card 520 again, or for receiving the distribution from distribution server 10 again, it is possible to receive only the license distributed thereto. Entry administration information 155 is recorded in a data region 5215C of license-dedicated memory card 520. Entry administration file 155 represents the state of use of the entry in license region 5215B of license-dedicated memory card 520. By referring to entry administration information 155, therefore, it is possible to determine the state of use of the entry.

Figure 12:
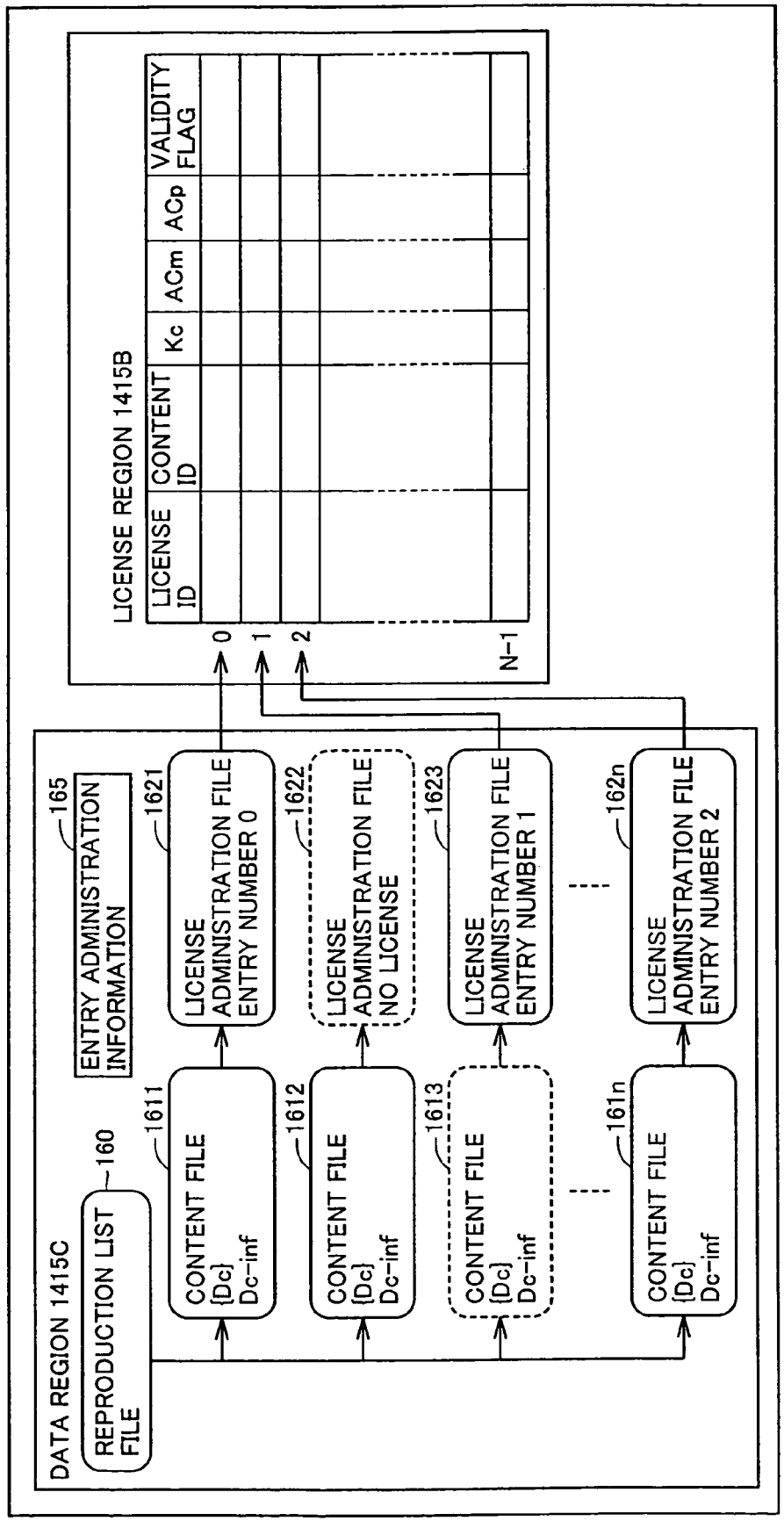
FIG. 12 illustrates a structure of a reproduction list file in a memory card.

FIG. 12 illustrates license region 1415B and data region 1415C in memory 1415 of memory card 110. In data region 1415C, memory 1415 records a reproduction list file 160, an entry administration information 165, content files 1611-161$n$ and license administration files 1621-162$n$. Each of content files 1611-161$n$ includes encrypted content data {Dc}Kc and additional information Dc-inf, which are received and recorded as one file. License administration files 1621-162$n$ are recorded corresponding to content files 1611-161$n$, respectively.

Memory card 110 records the encrypted content data and the license in memory 1415 when it receives the encrypted content data and the license from distribution server 10, or when it receives the encrypted content data and the license from personal computer 50 by the "shift session".

Accordingly, the license, which is received by license-dedicated memory card 520 of personal computer 50, is sent to memory card 110 by the shift session and corresponds to the encrypted content data of a high security level, is recorded at a region designated by the entry number in license region 1415B of memory 1415, and the entry number can be obtained by reading the license administration file in reproduction list file 160 recorded in data region 1415C of memory 1415. The license corresponding to the entry number thus obtained can be read from license region 1415B.

Although a license administration file 1622 is depicted by dotted line, this represents that it is not recorded practically. It is represented that content file 1612 is present, but cannot be reproduced because of lack of the license. This corresponds to the state, in which the reproduction terminal receives only the encrypted content data from another cellular phone.

Also, content file 1613 is depicted by dotted line. This corresponds, e.g., to the case where the reproduction terminal receives the encrypted content data and the license from distribution server 10, and sends only the encrypted content data thus received to another cellular phone, and means that the license is present in memory 1415, but the encrypted content data is not present therein.

[Shift/Copy]

In the data distribution system shown in FIG. 1, as described above, memory card 110 attached to cellular phone 100 can receive and record the license from distribution server 10 over the cellular phone network. In the data distribution systems shown in FIGS. 1 and 2, license-dedicated memory card 520 attached to personal computer 50 can receive and record the license provided from distribution server 10 over Internet network 30.

In the data distribution systems shown in FIGS. 1 and 2, memory card 110 or license-dedicated memory card 520 has a function of safely shifting and copying the recorded license to another memory card (including license-dedicated memory card), and allows shift/copy of the recorded license to another memory card. Naturally, the license can be shifted or copied between memory card 110 and license-dedicated memory card 520.

In the data distribution systems shown in FIGS. 1 and 2, therefore, the license recorded in license-dedicated memory card 520 attached to personal computer 50 can be shifted or copied to memory card 110 attached to cellular phone 100 or reproduction terminal 102. Conversely, the license recorded in memory card 110 attached to cellular phone 100 or reproduction terminal 102 can be shifted or copied to license-dedicated memory card 520 attached to personal computer 50. Consequently, convenience of the user can be improved.

Since the encrypted content data is recorded on hard disk 530 in personal computer 50 or data region 1415C in memory card 110, which can be freely accessed, it can be freely copied. However, the encrypted content data cannot be reproduced without shifting or copying the license.

Accordingly, description will now be given on an operation of shifting or copying the license recorded in memory card 110 or license-dedicated memory card 520 to another memory card.

In this case, the license is shifted or copied between the two memory cards each having the structure shown in FIG. 8, and each of personal computer 50, cellular phone 100 and reproduction terminal 102 performs merely data relaying processing by performing input/output processing on the data for the memory card (including license-dedicated memory card) attached thereto, and providing the communication path to the attached memory card. For the sake of simplicity, therefore, the description will be given in connection with a system shown in FIG. 13.

Figure 13:
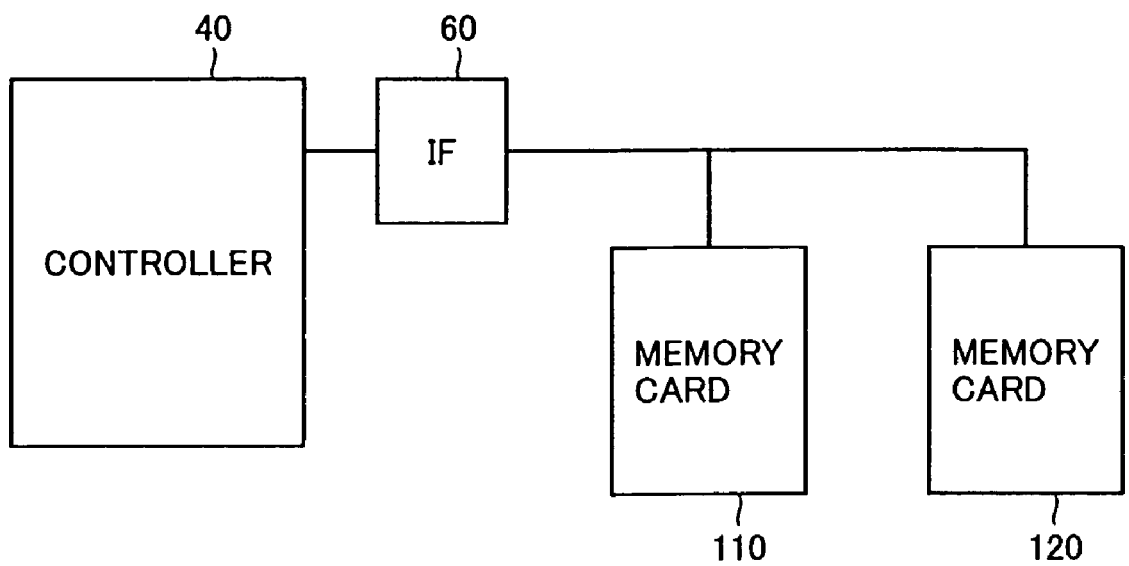
FIG. 13 is a schematic block diagram illustrating a concept of shifting between memory cards.

The system in FIG. 13 is formed of a controller 40, interface 60 controlling the memory card, and two memory cards 110 and 120. In the data distribution system shown in FIG. 1, it is assumed that the license is shifted or copied from license-dedicated memory card 520 attached to personal computer 50 to memory card 110 attached to cellular phone 100, or from memory card 110 attached to cellular phone 100 to license-dedicated memory card 520 attached to personal computer 50. In this case, memory card 120 corresponds to license-dedicated memory card 520, and interface 60 corresponds to memory card interface 525 of personal computer. 50 and memory card interface 1200 of cellular phone 100. Further, controller 40 performs the same function as controller 510 of personal computer 50 and controller 1106 of cellular phone 100, but does not have a structure and a function relating to the communication between personal computer 50 and cellular phone 100. When it is assumed that the data distribution system shown in FIG. 2 is employed, cellular phone 100 is replaced with reproduction terminal 102 in the description already given.

In the data distribution system shown in FIG. 1, cellular phone 100 can perform shift/copy of the license to another cellular phone over a public network. Further, cellular phone 100 or reproduction terminal 102 in the data distribution system shown in FIG. 1 or 2 may have its own communication means for communication between the terminals, and thereby, the shift/copy of the license can be performed from cellular phone 100 or reproduction terminal 102 to another cellular phone or another reproduction terminal. In this case, memory card 120 corresponds to a memory card attached to another cellular phone or another reproduction terminal. Interface 60 corresponds to memory card interface 1200 of cellular phone 100 or reproduction terminal 102 as well as the memory card interface of the cellular phone or reproduction terminal on the opposite side. Controller 40 corresponds to controller 1106 of cellular phone 100 or reproduction terminal 102 as well as the controller of the cellular phone or reproduction terminal on the opposite side. In FIG. 13, units relating to the communication by the above communication means are eliminated.

Further, reproduction terminal 102 shown in FIG. 7 is configured to attach one memory card. However, it may be configured to allow attachment of two or more memory cards. In this case, controller 40 corresponds to controller 1106 of reproduction terminal 102, and interface 60 corresponds to memory card interface 1200, which is modified to allow attachment of two or more memory cards. Cellular phone 100 may be likewise modified to allow attachment of two or more memory cards. In this case, reproduction terminal 102 in the description already given is replaced with cellular phone 100.

Further, a system performing shift/copy of the license can be configured by using a memory card writer for writing or reading the data into or from memory card 110 or a memory card drive device attached to a personal computer.

Figure 14:
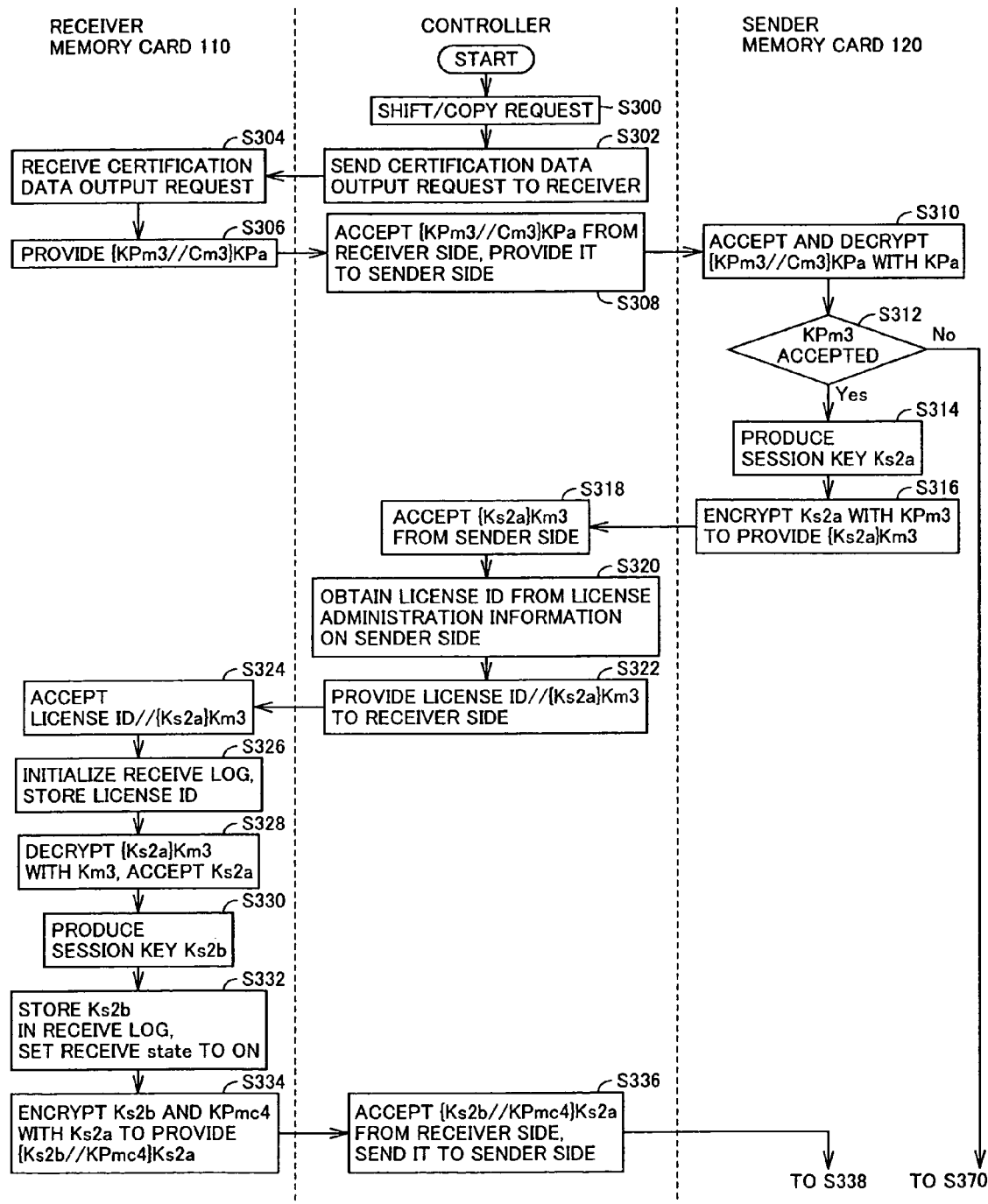
FIG. 14 is a first flowchart illustrating shift/copy operations for a license of encrypted content data in the data distribution systems shown in FIGS. 1 and 2.
Figure 15:
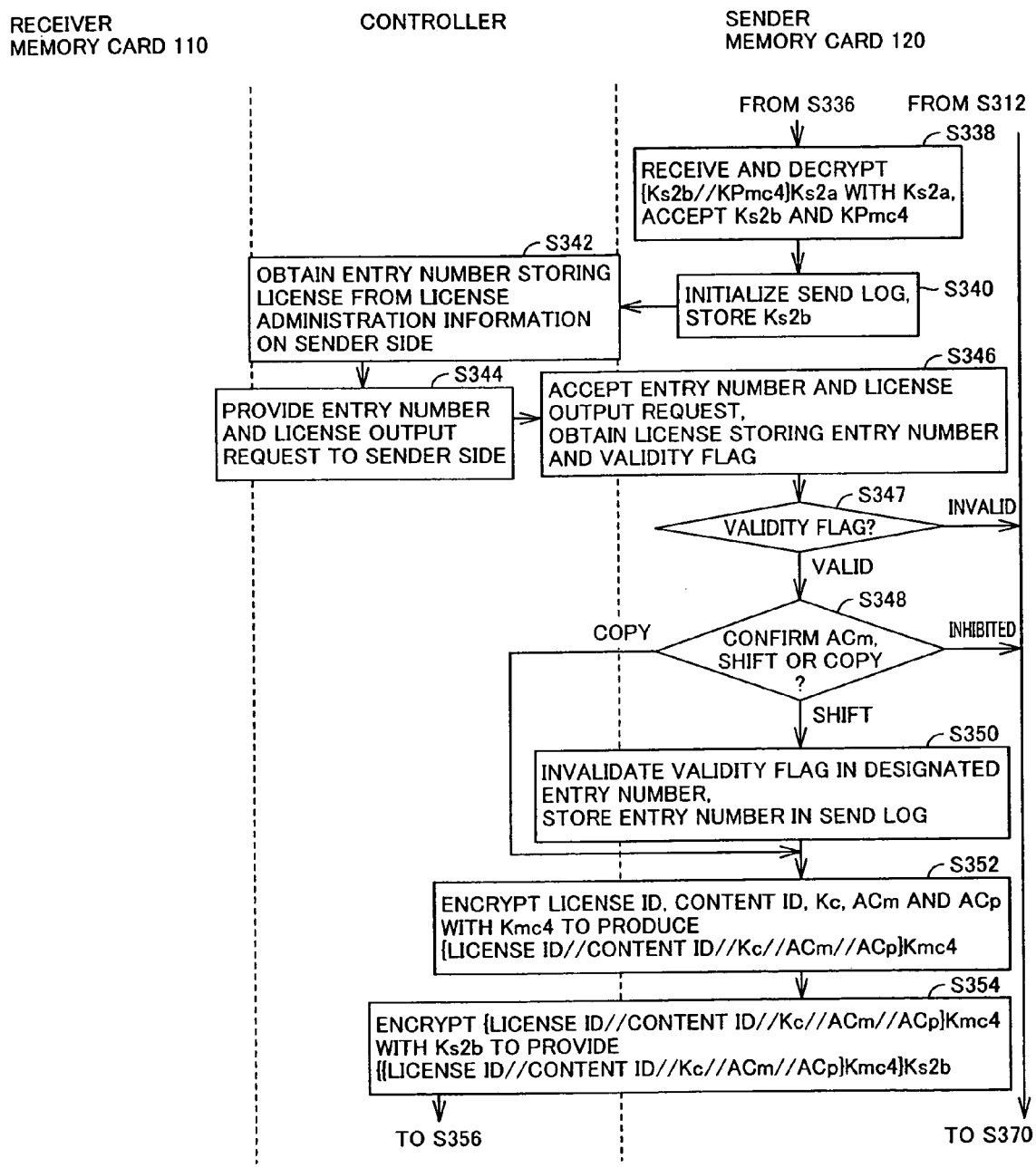
FIG. 15 is a second flowchart illustrating the shift/copy operations for the license of the encrypted content data in the data distribution systems shown in FIGS. 1 and 2.
Figure 16:
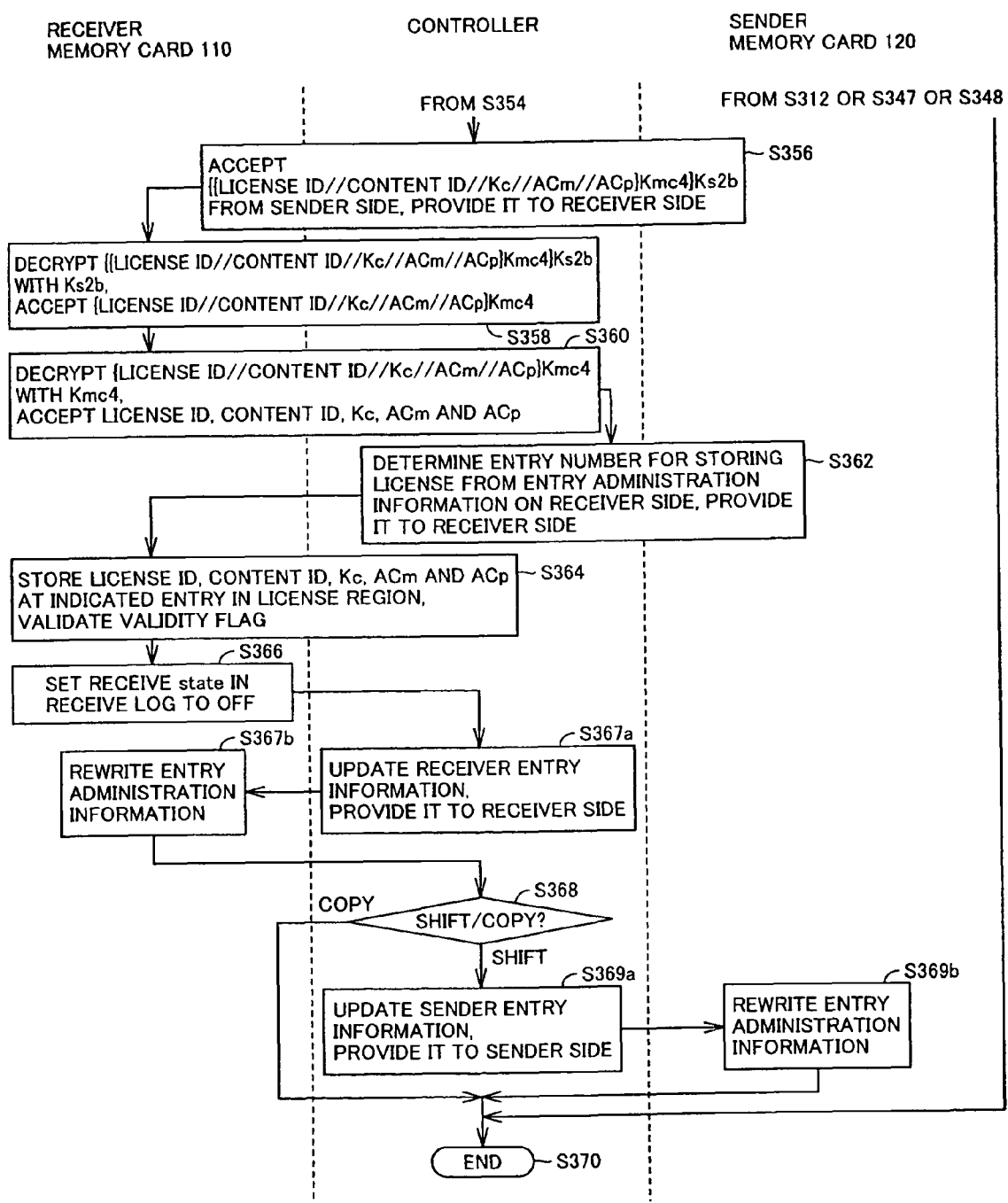
FIG. 16 is a third flowchart illustrating the shift/copy operations for the license of the encrypted content data in the data distribution systems shown in FIGS. 1 and 2.

FIGS. 14 to 16 are flowcharts illustrating shift/copy of the license recorded in memory card 120 shown in FIG. 13 to memory card 110. Before the processing in FIG. 14, controller 40 is connected to input means (not shown), by which the user designates the content corresponding to the license to be shifted or copied, and requests the shift/copy. Thereby, controller 40 receives the user's designation of the content corresponding to the license to be shifted or copied as well as the shift/copy request for the license. Controller 40 obtains the license administration file for performing the shift/copy of the license by referring to the reproduction list in memory card 120 on the sender side. The following description is based on the premise that the above operations are already performed. Also, it is assumed that the entry administration information stored in each of memory cards 120 and 110 on the sender and receiver sides is already obtained. Further, it is assumed that controller 40 has already determined the empty entry in license region 1415B of memory card 110 on the receiver side based on the entry administration information stored in memory card 120 on the receiver side.

Referring to FIG. 14, when a user sends a shift/copy request (step S300), controller 40 sends a send request for the certification data to memory card 110 via interface 60 (step S302). Controller 1420 of memory card 110 receives the send request for the certification data via terminal 1426, interface 1424 and bus BS4 (step S304).

When controller 1420 of memory card 110 receives the send request for the certification data, it reads certification data {KPm3//Cm3}KPa from certification data holding unit 1400 via bus BS4, and provides certification data {KPm3//Cm3}KPa thus read to interface 60 via bus BS4, interface 1424 and terminal 1426 (step S306). Controller 40 receives certification data {KPm3//Cm3}KPa via interface 60, and sends certification data {KPm3//Cm3}KPa of memory card 110 to memory card 120 via interface 60 (step S308).

Thereby, controller 1420 of memory card 120 receives certification data {KPm3//Cm3}KPa via terminal 1426 and interface 1424, and provides the received certification data {KPm3//Cm3}KPa to decryption processing unit 1408 via bus BS4. Decryption processing unit 1408 decrypts certification data {KPm3//Cm3}KPa with public certification key KPa provided from KPa holding unit 1414 (step S310). Controller 1420 performs the certification processing based on the result of decryption by a decryption processing unit 5208 for determining whether the decryption is performed correctly or not, and thus whether such a state is attained or not that memory card 110 is a regular memory card and controller 1420 received the certification data, which was encrypted for certifying its validity by a regular authority or the like, from memory card 110 (step S312). If it is determined that the certification data is valid, controller 1420 approves and accepts class public encryption key KPm3 and class certificate Cm3 obtained from the certification data. Then, the processing moves to a next step S314. If the certification data is not valid, controller 1420 does not approve class public encryption key KPm3 and class certificate Cm3, and the processing ends without accepting these keys (step S370).

When it is certified that the target memory for the shift/copy of the license is the regular memory card having the valid certification data, controller 1420 in memory card 120 controls session key generating unit 1418 to produce a session key Ks2a for the shift (step S314). Encryption processing unit 1410 encrypts session key Ks2a with class public encryption key KPm3, which is provided by decryption processing unit 1408 and corresponds to memory card 110. Controller 1420 of memory card 120 obtains encrypted data {Ks2a}Km3 via bus BS4, and provides it to interface 60 via bus BS4, interface 1424 and terminal 1426 (step S316).

Controller 40 accepts encrypted data {Ks2a}Km3 from the sender side via interface 60 (step S318), and obtains the license ID from the license administration information of memory card 120 on the sender side (step S320). Controller 40 combines the obtained license ID and encrypted data {Ks2a}Km3 accepted in step S318 to provide license ID//{Ks2a}Km3 as single data to memory card 110 via interface 60 (step S322). Controller 1420 of memory card 110 accepts license ID//{Ks2a}Km3 via terminal 1426, interface 1424 and bus BS4. Controller 1420 of memory card 110 initializes log region 1415A of memory 1415, and stores the accepted license ID in log region 1415A (step S326). This initialization of the receive log erases the license ID and session key Ks2, which were stored at the time of distribution of the license of the encrypted content data in steps S130 and S136 in FIG. 9. Thereafter, controller 1420 provides encrypted data {Ks2a}Km3 to decryption processing unit 1422. Decryption processing unit 1422 decrypts encrypted data {Ks2a}Km3 with class private decryption key Km3 provided from Km holding unit 1421, and accept session key Ks2a (step S328). Session key generating unit 1418 produces a session key Ks2b (step S330). Controller 1420 receives session key Ks2b via bus BS4, stores session key Ks2b thus received in the receive log of log region 1415A in memory 1415, and sets the receive state to ON (step S332). This storage of session key Ks2b results in that the history information for specifying the shift/copy of the license from memory card 120 to memory card 110 is recorded in the receive log.

Thereby, encryption processing unit 1406 of memory card 110 encrypts session key Ks2b and individual public encryption key KPmc4, which are obtained by successively selecting the contacts of selector switch 1446, with session key Ks2a decrypted by decryption processing unit 1404 to produce encrypted data {Ks2b//KPmc4}Ks2a. Controller 1420 of memory card 120 provides encrypted data {Ks2b//KPmc4}Ks2a to interface 60 via bus BS4, interface 1424 and terminal 1426 (step S334).

Controller 40 accepts encrypted data {Ks2b//KPmc4}Ks2a from memory card 110 via interface 60. Controller 40 sends encrypted data {Ks2b//KPmc4}Ks2a to memory card 120 via interface 60 (step S336). When memory card 110 provides encrypted data {Ks2b//KPmc4}Ks2a in step S334, it can be considered that communication for shift/copy of the license is established between memory cards 110 and 120.

Referring to FIG. 15, controller 1420 of memory card 120 receives encrypted data {Ks2b//KPmc4}Ks2a via terminal 1426, interface 1424 and bus BS4, and provides encrypted data {Ks2b//KPmc4}Ks2a thus received to decryption processing unit 1412. Decryption processing unit 1412 decrypts encrypted data {Ks2b//KPmc4}Ks2a with session key Ks2a provided from session key generating unit 1418, and accepts session key Ks2b and public encryption key KPmc4 (step S338).

Thereby, controller 1420 of memory card 120 initializes the send log included in log region 1415A of memory 1415, and stores the accepted session key Ks2b in the send log (step S340). This initialization results in such an operation that session key Ks2b, which is the history information for specifying the shift/copy of the license from memory card 120 to memory card 110, is recorded in the send log.

Thereafter, controller 40 obtains the entry number of the entry storing the license, which is to be shifted or copied, from the license administration information in memory card 120 on the sender side (step S342), and sends the obtained entry number to memory card 120 via interface 60 (step S344). Controller 1420 of memory card 120 receives the entry number via terminal 1426, interface 1424 and bus BS4, and obtains the license (license ID, content ID, license key Kc, access control information ACm and reproduction control information ACp) and the validity flag from the entry, which is designed by the received entry number, in license region 1415B of memory 1415 (step S346).

Controller 1420 determines the validity flag (step S347). When the validity flag is valid, the processing moves to a next step S348. When it is invalid, this represents that the designated license is already shifted, and the license is not available so that the processing moves to a step S370, and the shift/copy operation ends. When the validity flag is valid in step S347, controller 1420 determines access control information ACm (step S348). Thus, controller 1420 first determines, based on obtained access control information ACm, whether the license to be shifted or copied to memory card 110 is already disabled from reproducing the encrypted content data due to the usage count or not. If the usage count is already reduced to zero, the license cannot reproduce the encrypted content data, and it is meaningless to shift the encrypted content data and the license to memory card 110. Therefore, controller 1420 first performs the above determination. When the reproduction is allowed, it is determined from the shift/copy flag whether the shift and copy of the license are allowed or not.

When it is determined in step S348 that the encrypted content data cannot be reproduced due to the usage count equal to zero, or that the shift/copy flag inhibits the shift/copy (i.e., is equal to zero), it is determined from access control information ACm that neither shift nor copy is possible, and the processing moves to a step S370 to terminate the shift/copy operation. When it is determined in step S348 that the encrypted content data can be reproduced (usage count≠0), and that the shift/copy flag allows only shifting (i.e., is equal to one), it is determined that the shifting of license is to be performed, and controller 1420 invalidates the validity flag at the designated entry number in license region 1415B of memory 1415, and stores this entry number in the send log (step S350). When the encrypted content data can be reproduced (usage count≠0), and the shift/copy flag allows the shifting and copying (i.e., is equal to three), it is determined that the copying of license is to be performed, and the processing moves to a step S352 without performing processing in step S350.

After step S348 or S350, encryption processing unit 1417 of memory card 120 encrypts the license with public encryption key KPmc4, which is obtained by decryption processing unit 1412 and is peculiar to memory card 110, to produce encrypted data {license ID//content ID//Kc//ACm//ACp}Kmc4 (step S352). Encryption processing unit 1406 receives encrypted data {license ID//content ID//Kc//ACm//ACp}Kmc4 encrypted by encryption processing unit 1417 via a contact Pc of switch 1446, also receives session key Ks2b decrypted by decryption processing unit 1412 via a contact Pb of switch 1442, and encrypts encrypted data {license ID//content ID//Kc//ACm//ACp}Kmc4 with session key Ks2b. Then, controller 1420 of memory card 120 provides encrypted data {{license ID//content ID//Kc//ACm//ACp}Kmc4}Ks2b via bus BS4, interface 1424 and terminal 1426 (step S354).

For shifting the license, as described above, the processing in step S352 is performed after invalidating the validity flag of license region 1415B (see step S350). For copying the license, the processing moves to step S352 without performing processing in step S350, in which the validity flag of the license is invalidated for allowing use of the license in both the original side and the copy side, and thus the validity flag is continuously kept valid. Therefore, when the license is shifted, the license can be no longer read from memory card 120 on the sender side, similarly to the case, in which the license is erased.

Referring to FIG. 16, controller 40 accepts encrypted data {{license ID//content ID//Kc//ACm//ACp}Kmc4}Ks2b from memory card 120 via interface 60, and provides encrypted data {{license ID//content ID//Kc//ACm//ACp}Kmc4}Ks2b thus accepted to memory card 110 (step S356).

Controller 1420 of memory card 110 receives encrypted data {{license ID//content ID//Kc//ACm//ACp}Kmc4}Ks2b via terminal 1426, interface 1424 and bus BS4, and provides it to decryption processing unit 1412. Decryption processing unit 1412 receives encrypted data {{license ID//content ID//Kc//ACm//ACp}Kmc4}Ks2b via bus BS4, and decrypts it with session key Ks2b generated by session key generating unit 1418 to accept encrypted data {license ID//content ID//Kc//ACm//ACp}Kmc4 (step S358).

Thereafter, decryption processing unit 1404 decrypts encrypted data {license ID//content ID//Kc//ACm//ACp}Kmc4 with private decryption key Kmc4 in accordance with the instruction by controller 1420, and the license (license key Kc, license ID, content ID, access control information ACm and reproduction control information ACp) is accepted (step S360).

Thereby, controller 40 refers to the entry administration information of memory card 110 on the receiver side to obtain the entry number of the empty region, and provides the entry number thus obtained to memory card 110 as the entry number for storing the shifted or copied license (step S362).

Controller 1420 of memory card 110 receives the entry number via terminal 1426 and interface 1424, stores the license (license key Kc//license ID//content ID//access control information ACm//reproduction control information ACp), which is accepted in step S360, in license region 1415B of memory 1415 in accordance with the received entry number, and validates the validity flag in the same entry (step S364). Controller 1420 sets the receive state, which is recorded in the receive log included in log region 1415A, to OFF (step S366). Thereafter, controller 40 updates the entry administration information for memory card 110 on the receiver side by changing the entry bearing the recorded license to "being used", and provides it to memory card 110 on the receiver side (step S367a). Controller 1420 of memory card 110 on the receiver side rewrites the entry administration information in data region 1415C of memory 1415 with the entry administration information thus provided (step S367b). Then, controller 40 determines whether the license was to be shifted or to be copied (step S368). When it was to be copied, the license copying processing ends in this stage (step S370). When it was to be shifted, controller 40 updates the entry administration information for memory card 120 by changing the entry previously storing the shifted license to "not used", and provides it to memory card 120 on the sender side (step S369a). Controller 1420 of memory card 120 on the sender side rewrites the entry administration information in data region 1415C of memory 1415 with the entry administration information thus provided (step S369b). Then, the license shifting processing ends (step S370).

The shifting or copying of the encrypted content data from memory card 120 to memory card 110 may be performed by reading the encrypted content data from data region 1415C in memory card 120, and sending it to memory card 110 after the end of shifting or copying of the license.

For memory card 110 on the receiver side, the license administration file is updated by writing the entry number and others in the license administration file when the license administration file is already recorded for the shifted or copied license. When the license administration file to be updated is not recorded in memory card 110, a new license administration file is produced, and is recorded in memory card 110 on the receiver side. In this processing, if the memory card on the receiver side is license-dedicated memory card 520 in the data distribution system shown in FIG. 1 or 2, hard disk 530 stores the license administration file.

As described above, it is confirmed that memory card 110 attached to reproduction terminal 102 is the regular device, and at the same time, it is confirmed that public encryption key KPm3 sent in a form encrypted together with class certificate Cm3 is valid. Only after confirming these facts, the license can be shifted only in response to the request for shift to the regular memory card so that shifting of the license to an invalid memory card can be inhibited.

The encryption keys produced by the memory cards are sent and received between the opposite sides, and operations are performed on each side to execute the encryption with the received encryption key, and to send the encrypted data to the other side. Thereby, mutual certification can be practically performed in each operation of transmitting the encrypted data so that the security in the operation of shifting and copying the license can be improved.

The description has been given on the operations of shifting and copying the license of the encrypted content data between the memory cards. However, the shifting and copying of the license from license-dedicated memory card 520 of personal computer 50 to memory card 110 can be performed in accordance with flowcharts of FIGS. 14 and 15. By using these shifting and copying operations, even a user of reproduction terminal 102 not having a function of communicating with distribution server 10 can receive the license of the encrypted content data on its memory card via personal computer 50. This improves convenience of the user.

The shifting of the license from memory card 110 to license-dedicated memory card 520 is performed in accordance with the flowcharts of FIGS. 14 to 16. Thus, cellular phone 100 in FIG. 1 receives the distribution, and the encrypted content data and the license stored in memory card 110 can be saved in personal computer 50.

Figure 17:
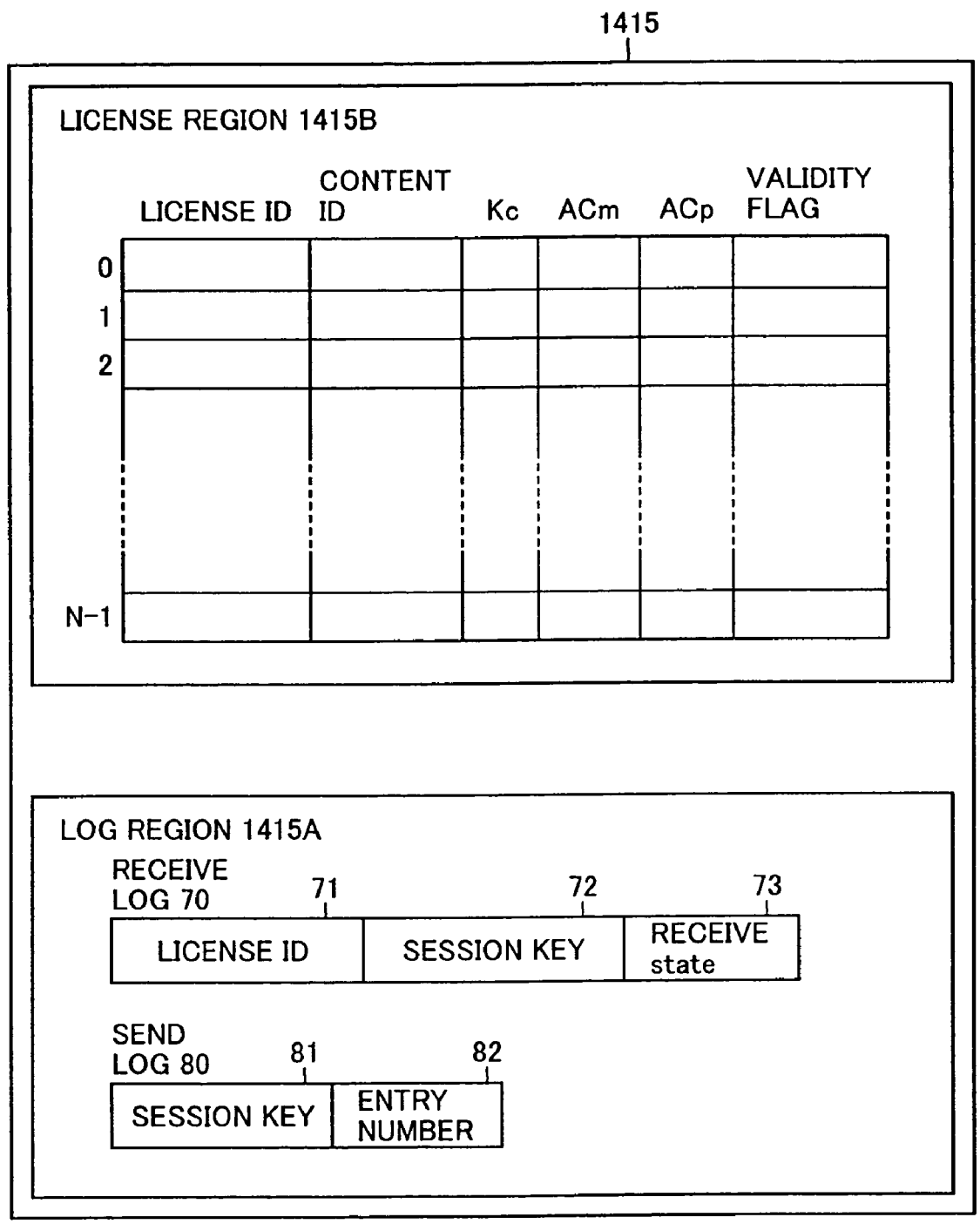
FIG. 17 is a schematic block diagram illustrating a log region in a memory card.

Referring to FIG. 17, description will now be given on the receive log and the send log stored in log region 1415A. License region 1415B stores license ID, content ID, license key Kc, access control information ACm, reproduction control information ACp and the validity flag corresponding to the entry numbers of 0-(N−1). The validity flag represents the validity of the license (license ID, content ID, license key Kc, access control information ACm and reproduction control information ACp). When the validity flag is "valid", this means that the reproduction can be performed with this license, or this license can be shifted or copied to another memory card 110 or license-dedicated memory card 520. When the validity flag is "invalid", this means that the reproduction cannot be performed with this license, and the license can be neither shifted nor copied to another memory card 110 or license-dedicated memory card 520. Thus, the above equivalently means that the license is not present. After the license to be shifted is obtained from memory card 120, the validity flag of license region 1415B is invalidated (step S350 in FIG. 15). The purpose of this is to inhibit using of the license in memory card 120 after this license is shifted from memory card 120 to memory card 110.

Log region 1415B stores a receive log 70 and a send log 80. Receive log 70 is formed of a license ID 71, a session key 72 and a receive state 73. Send log 80 is formed of a session key 81 and an entry number 82. Receive log 70 is used for recording the communication history when memory card 110 or license-dedicated memory card 520 receives the license from another memory card or another license-dedicated memory card. Send log 80 is used for recording the communication history when the license is shifted or copied to another memory card or another license-dedicated memory card.

License region 1415B and log region 1415A are preferably provided in a TRM region. Log region 1415A, license region 1415B and data region 1415C are not required to be included in a single region, and may be independent of each other. Further, receive log 70 and send log 80 recorded in log region 1415A must be configured to prevent external rewriting.

In the operation of receiving the license by memory card 110 or license-dedicated memory card 520 from distribution server 10, the license ID and the session key produced by its own session key generating unit 1418 are recorded in receive log 70 (see steps S130 and S136 in FIG. 9), and receive state 73 recorded in receive log 70 is set to ON (see step S136 in FIG. 9). In the operation of receiving the license by memory card 110 or license-dedicated memory card 520 from another memory card or another license-dedicated memory card, the license ID and the session key produced by its own session key generating unit 1418 are recorded in receive log 70 (see steps S326 and S332 in FIG. 14), and the receive state is set to ON (see step S332 in FIG. 14).

Meanwhile, in the operation of shifting the license from memory card 120 shown in FIG. 13 to memory card 110, the session key sent from memory card 110 on the receiver side and the entry number to be shifted or copied are recorded in send log 80 (see steps S340 and S350 in FIG. 15). In the processing of performing shift/copy from memory card 120 to memory card 110, the same session key Ks2b is recorded in session key 72 of receive log 70 and session key 81 in send log 80 (see step 332 in FIG. 14 and steps S340 in FIG. 15). Therefore, when the communication is interrupted during the shifting or copying of the license from memory card 120 to memory card 110, the processing of shifting or copying the license from memory card 120 to memory card 110 can be specified by determining that session key 81 recorded in send log 80 of memory card 120 matches with session key 72 recorded in receive log 70 of memory card 110.

In the operation of distributing the license to memory card 110, when memory card 110 sends session key Ks2 produced in memory card 110 to distribution server 10, receive state 73 is set to ON (step S138 in FIG. 9). After the license received from distribution server 10 is stored in license region 1415B in memory 1415, receive state 73 is set to OFF (step S162 in FIG. 10). Therefore, receive state 73 is kept ON between steps S138 and S162. Accordingly, when a certain factor interrupts the communication, receive state 73 is read from receive log 70 in memory card 110, and it is determined whether receive state 73 is ON or OFF, whereby it is possible to determine the state, in which the communication is interrupted. When receive state 73 thus read is ON, it is determined that the communication was interrupted when the license was not stored in license region 1415B of memory card 110. When receive state 73 is OFF, it is determined that the communication was interrupted after the license was stored in license region 1415B of memory card 110.

Likewise, in the processing of shifting or copying the license from memory card 120 to memory card 110, receive state 73 is kept ON during a period from step S332 in FIG. 14 to step S364 in FIG. 16. Therefore, the same description as that, which is already given to the license distribution, can be given to this case.

[Restoration]

When communication is interrupted while the license is being shifted from memory card 120 to memory card 110 in accordance with the flowcharts of FIGS. 14 to 16, the license to be shifted is restored in memory card 120. This restoring operation will now be described with reference to FIGS. 18 and 19. After it is determined in a step S348 illustrated in FIG. 15 that "shift" is to be performed, the shift operation may be interrupted due to interruption of communication between steps S350 and S364 in FIGS. 15 and 16. In this case, such a state occurs that the license is present in neither memory card 120 on the sender side nor memory card 110 on the receiver side, and disappearance or absence of the license occurs. In this case, the license to be shifted is restored in memory card 120 on the sender side. It is assumed that the following operation is performed in the system shown in FIG. 13.

Figure 18:
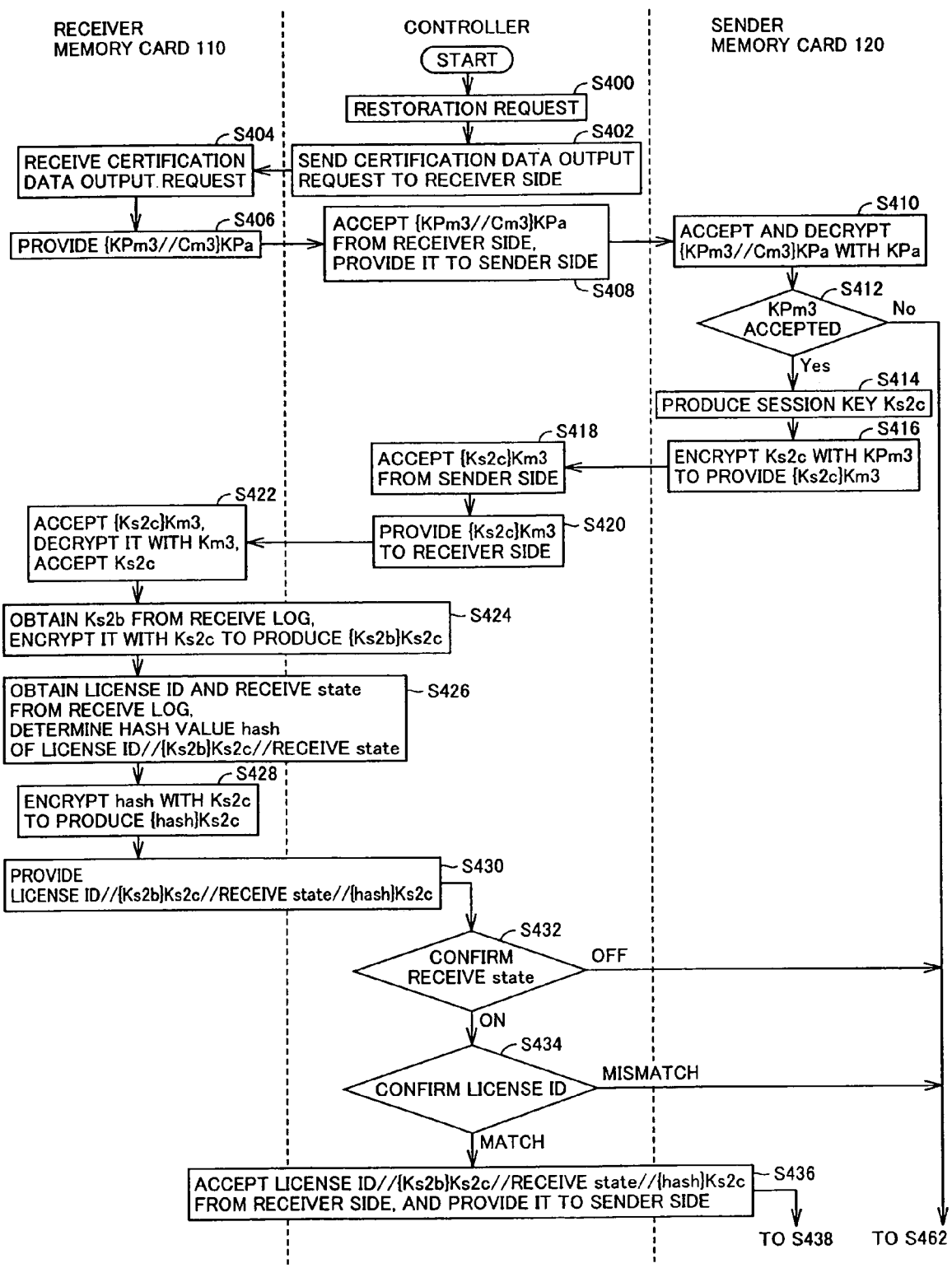
FIG. 18 is a first flowchart illustrating a restoring operation for the license.

Referring to FIG. 18, when a user enters a restoration request through console panel 1108 of cellular phone 100 (step S400), controller 40 sends a send request for certification data to memory card 110 via interface 60 (step S402). Controller 1420 of memory card 110 receives the send request for the certification data via terminal 1426, interface 1424 and bus BS4 (step S404).

When controller 1420 receives the send request for the certification data, it reads certification data {KPm3//Cm3}KPa from certification data holding unit 1400 via bus BS4, and provides the read certification data {KPm3//Cm3}KPa to controller 40 via bus BS4, interface 1424 and terminal 1426 (step S406). Controller 40 receives certification data {KPm3//Cm3}KPa via interface 60, and sends certification data {KPm3//Cm3}KPa to memory card 120 via interface 60 (step S408).

Thereby, controller 1420 of memory card 120 receives certification data {KPm3//Cm3}KPa via terminal 1426 and interface 1424, and provides received certification data {KPm3//Cm3}KPa to decryption processing unit 1408 via bus BS4. Decryption processing unit 1408 decrypts certification data {KPm3//Cm3}KPa with public certification key KPa provided from KPa holding unit 1414 (step S410). From the result of decryption by decryption processing unit 5208, controller 1420 determines whether the processing was performed normally or not, and thus whether such conditions are satisfied or not that memory card 110 is a regular memory card and controller 1420 received the certification data, which was encrypted for certifying its validity by a regular authority, from memory card 110 (step S412). If it is determined that the certification data is valid, controller 1420 approves and accepts class public encryption key KPm3 and class certificate Cm3. Then, the processing moves to a next step S414. If the certification data is not valid, controller 1420 does not approve class public encryption key KPm3 and class certificate Cm3, and the processing ends without accepting these keys (S462).

When it is determined from the certification processing that the certification data is provided from the regular memory card having the valid certification data, controller 1420 in memory card 120 controls session key generating unit 1418 to produce session key Ks2c for the shift (step S414). Encryption processing unit 1410 encrypts session key Ks2c with class public encryption key KPm3, which is provided by decryption processing unit 1408 and corresponds to memory card 110. Controller 1420 obtains encrypted data {Ks2c}Km3 via bus BS4, and provides it via bus BS4, interface 1424 and terminal 1426 (step S416).

Controller 40 accepts encrypted data {Ks2c}Km3 from the sender side via interface 60 (step S418), and provides encrypted data {Ks2c}Km3 thus accepted via interface 60 to memory card 110 (step S420). This serves as an operation of instructing memory card 110 to output the receive log.

Controller 1420 of memory card 110 accepts encrypted data {Ks2c}Km3 via terminal 1426, interface 1424 and bus BS4, and provides it to decryption processing unit 1422. Decryption processing unit 1422 decrypts encrypted data {Ks2c}Km3 with private decryption key Km3 sent from Km holding unit 1421, and accepts session key Ks2b (step S422). Controller 1420 obtains session key Ks2b from receive log 70 in log region 1415A of memory 1415, and provides session key Ks2b thus obtained to encryption processing unit 1406 via a contact Pf of switch 1446. Encryption processing unit 1406 receives session key Ks2c decrypted by decryption processing unit 1422 via contact Pa of switch 1442, and encrypts session key Ks2b with session key Ks2c to produce encrypted data {Ks2b}Ks2c {step S424}. Controller 1420 obtains license ID and the receive state from receive log 70, produces license ID//{Ks2b}Ks2c//receive state, and obtains a hash value "hash" of license ID//{Ks2b}Ks2c//receive state (step S426). Thus, controller 1420 adds a signature to license ID//{Ks2b}Ks2c//receive state.

Thereafter, controller 1420 provides hash value "hash" to encryption processing unit 1406 via contact Pf of switch 1446, and encryption processing unit 1406 encrypts hash value "hash" with session key Ks2c to produce encrypted data {hash}Ks2c (step S428). Controller 1420 produces and provides license ID//{Ks2b}Ks2c//receive state/{hash}Ks2c (step S430). Thus, the signature on license ID//{Ks2b}Ks2c//receive state is further encrypted with session key Ks2c to prevent tampering of license ID//{Ks2b}Ks2c//receive state.

Controller 40 receives license ID//{Ks2b}Ks2c//receive state//{hash}Ks2c via interface 60, and confirms the receive state (step S432). When the receive state is OFF, this means that the communication was interrupted after the license was shifted or copied from memory card 120 to memory card 110. Therefore, the license restoring operation ends (step S462). When the receive state is ON in step S432, and thus when it is confirmed that the communication was interrupted while the license was being shifted or copied from memory card 120 to memory card 110, controller 40 determines the license ID. Thus, it is determined whether license ID read from memory card 110 (step S426) matches with license ID held in memory card 120 or not. When the two license IDs do not match with each other, the license to be shifted or copied cannot be specified so that the license restoring operation ends (step S462). When the two license IDs match with each other in step S434, controller 40 provides license ID//{Ks2b}Ks2c//receive state/{hash}Ks2c to memory card 120 (step S436).

Referring to FIG. 19, controller 1420 of memory card 120 accepts license ID//{Ks2b}Ks2c//receive state//{hash}Ks2c via terminal 1426, interface 1424 and bus BS4 (step S438), and obtains hash value "hash" of license ID//{Ks2b}Ks2c//receive state (step S440). Controller 1420 provides encrypted data {hash}Ks2c thus accepted to decryption processing unit 1412, decryption processing unit 1412 decrypts encrypted data {hash}Ks2c with session key Ks2c provided from session key generating unit 1418, and accepts hash value "hash" produced in memory card 110 (step S442).

Thereafter, controller 1420 of memory card 120 determines whether hash value "hash" obtained by itself (step S440) matches with hash value 0"hash" produced in memory card 110 or not (step S444). When the two hash values "hash" do not match with each other, this means that the signature on license ID//{Ks2b}Ks2c//receive state is tampered. Therefore, the license restoring processing ends (step S462). When the two hash values "hash" match with each other in step S444, controller 1420 determines the receive state (step S446). When the receive state is OFF, this means that the communication was interrupted after the license was shifted or copied from memory card 120 to memory card 110. Therefore, the license restoring operation ends (step S462). When the receive state is ON in step S446, and thus when it is confirmed that the communication was interrupted while the license was being shifted or copied from memory card 120 to memory card 110, controller 1420 provides encrypted data {Ks2b}Ks2c thus accepted to decryption processing unit 1412. Decryption processing unit 1412 decrypts encrypted data {Ks2b}Ks2c with session key Ks2c provided from session key generating unit 1418, and accepts session key Ks2b (step S448).

Thereafter, controller 1420 reads session key Ks2b recorded in send log of log region 1415A in memory 1415, and determines whether the session key Ks2b thus read matches with received session key Ks2b or not (step S450). When the two session keys do not match with each other, session key Ks2b received from memory card 110 is a session key specifying different shift/copy processing so that the license restoring processing ends (step S462). When the two session keys match with each other in step S450, controller 1420 determines whether an entry number is recorded in the send log provided in log region 1415A of memory 1415 or not (step S452). If the entry number is not recorded, this means that the license shift/copy processing is not performed so that the license restoring processing ends (step S462). When it is determined in step S452 that the entry number is recorded in the send log, controller 1420 reads the entry number in the send log, and obtains the license ID, which is stored in the region designated by the entry number thus read, from license region 1415B (step S454).

Controller 1420 compares the license ID received from memory card 110 with license ID obtained from license region 1415B of memory card 120 (step S456). When the two license IDs do not match with each other, the license restoring processing ends (step S462). When the two license IDs match with each other in step S456, controller 1420 changes the validity flag of the license designated by the entry number, which is recorded in the send log of log region 1415A, from "invalid" to "valid" (step S458). Thereby, the license is restored on the sender side of the license. Thereafter, controller 1420 of memory card 120 initializes the send log of log region 1415A (step S460), and the license restoring processing ends (step S462).

As described above, the restoring of the license can be performed on the sender side, e.g., on the conditions that the opposite side is the same as the destination of the interrupted shift/copy processing of the license, and the interrupted shift/copy processing is specified. The signing on license ID//{Ks2b}Ks2c//receive state is performed by memory card 110 (receiver side) and memory card 120 (sender side), and it is determined that the signatures in these cards match with each other. Thereafter, the license restoring processing is continued so that the safe license restoration can be ensured.

The description has been given on the shift of the license from memory card 120 to memory card 110 as well as the restoration of the license in the operation of shifting the license from memory card 120 to memory card 110. However, the shifting of the license from memory card 110 to memory card 120 as well as the license restriction are performed in accordance with the flowcharts of FIGS. 14 to 16, 18 and 19. Further, the shifting of the license from one of memory cards other than memory cards 110 and 120 as well as the license restoration are performed in accordance with the flowcharts of FIGS. 14 to 16, 18 and 19.

[Reproduction]

As described above, memory card 110 attached to cellular phone 100 or reproduction terminal 102 can directly receive the encrypted content data and the license from distribution server 10. Memory card 110 can receive the encrypted content data and the license, which are taken into personal computer 50 by hardware from distribution server 10, from personal computer 50 according to the concept of "shift".

As described above, memory card 110 receives the encrypted content data and the license in various manners. The encrypted content data, which is received in the memory card in various manners, is reproduced as follows.

Figure 20:
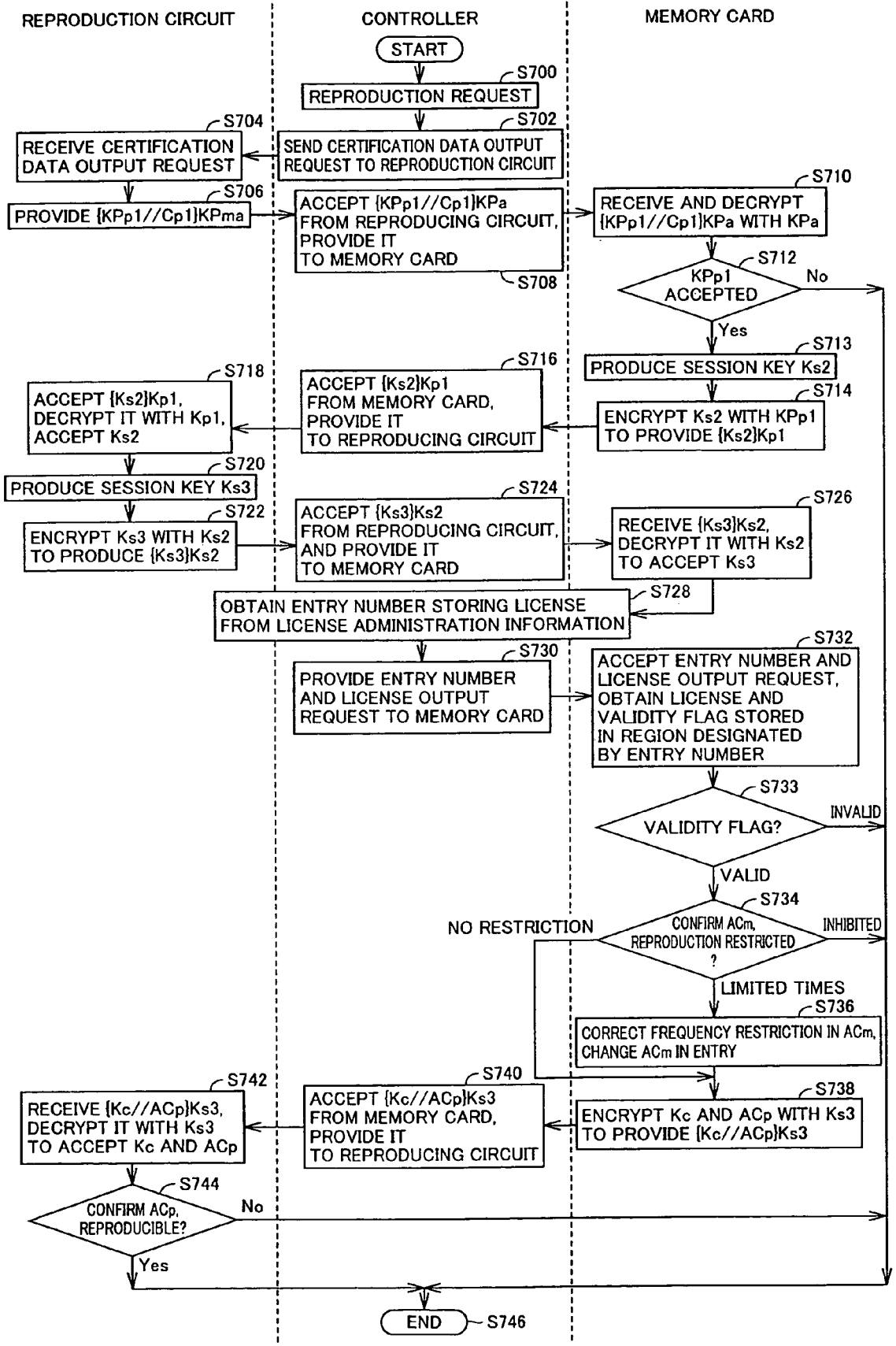
FIG. 20 is a flowchart illustrating a reproducing operation in a cellular phone or a terminal device.

FIG. 20 is a flowchart illustrating the operation of reproducing the content data, which is received by memory card 110, by reproduction terminal 102. Before the processing illustrated in FIG. 20, the user of reproduction terminal 102 determines the content (song or tune) to be reproduced in accordance with the reproduction list file, which is recorded in data region 1415C of memory card 110, specifies the content file and obtains the license administration file. The following description is based on the premise that the above operation is already performed.

Upon start of the reproduction, as illustrated in FIG. 20, the user of reproduction terminal 100 inputs the reproduction instruction through console panel 1108 to reproduction terminal 100 (step S700). Thereby, controller 1106 requests the output of certification data to content reproducing circuit 1550 via bus BS3 (step S702), and content reproducing circuit 1550 receive this output request for the certification data (step S704). Certification data holding unit 1500 provides certification data {KPp1//Cp1}KPa (step S706), and controller 1106 provides certification data {KPp1//Cp1}KPa to memory card 110 via memory card interface 1200 (step S708).

Thereby, memory card 110 accepts certification data {KPp1//Cp1}KPa, and decryption processing unit 1408 decrypts accepted certification data {KPp1//Cp1}KPa with public certification key KPa held in KPa holding unit 1414 (step S710). Controller 1420 performs the certification processing based on the result of decryption in decryption processing unit 1408. This certification processing is performed for determining whether certification data {KPp1//Cp1}KPa is the regular certification data or not (step S712). If it cannot be decrypted, the processing moves to a step S746, and the reproducing operation ends. When the certification data can be decrypted, controller 1420 controls session key generating unit 1418 to generate session key Ks2 for the reproduction session (step S712). Encryption processing unit 1410 encrypts session key Ks2 provided from session key generating unit 1418 with public encryption key KPp1, which is decrypted by decryption processing unit 1408, and provides encrypted data {Ks2}Kp1, which is encrypted with public encryption key KPp1 decrypted by decryption processing unit 1408, onto bus BS3. Thereby, controller 1420 provides encrypted data {Ks2}Kp1 to memory card interface 1200 via interface 1424 and terminal 1426 (step S714). Controller 1106 of reproduction terminal 102 obtains encrypted data {Ks2}Kp1 via memory card interface 1200. Controller 1106 provides encrypted data {Ks2}Kp1 to decryption processing unit 1504 of content reproducing circuit 1550 via bus BS3 (step S716). Decryption processing unit 1504 decrypts encrypted data {Ks2}Kp1 with class private decryption key Kp1, which is paired with class public encryption key KPp1, and provides session key Ks2 to encryption processing unit 1506 (step S718). Thereby, session key generating unit 1508 generates session key Ks3 for reproduction session, and provides session key Ks3 to encryption processing unit 1506 (step S720). Encryption processing unit 1506 encrypts session key Ks3 provided from session key generating unit 1508 with session key Ks2 provided from decryption processing unit 1504 to provide encrypted data {Ks3}Ks2 (step S722). Controller 1106 provides encrypted data {Ks3}Ks2 to memory card 110 via bus BS3 and memory card interface 1200 (step S724).

Thereby, decryption processing unit 1412 of memory card 110 receives encrypted data {Ks3}Ks2 via terminal 1426, interface 1424 and bus BS4. Decryption processing unit 1412 decrypts encrypted data {Ks3}Ks2 with session key Ks2 generated by session key generating unit 1418, and accepts session key Ks3 generated in reproduction terminal 102 (step S726).

Controller 1106 of reproduction terminal 102 obtains the entry number, at which the license is stored, from the license administration file of the reproduction request tunes obtained in advance from memory card 110 (step S728), and provides the obtained entry number and the usage permission request to memory card 110 via memory card interface 1200 (step S730).

Controller 1420 of memory card 110 accepts the entry number and the usage permission request, and obtains the license and the validity flag stored in the region designated by the entry number (step S732). Controller 1420 determines the validity flag (step S733). When the validity flag is "invalid" in step S733, the license is not present in the designated entry so that the reproducing operation ends (step S746). When the validity flag is "valid" in step S733, the license is present in the designated entry so that the processing moves to a next step S734.

Controller 1420 determines access control information ACm (step S734).

In step S734, access control information ACm, which is the information relating to the restriction on the access to memory, is determined. More specifically, the usage count is determined. If the reproduction is already impossible, the reproducing operation ends. If the usage count in access control information ACm is restricted, the usage count in access control information ACm is changed (step S736). Then, the processing moves to a next step S738. If the usage count in access control information ACm does not restrict the reproduction, step S736 is skipped, and the processing moves to next step S738 without changing the usage count in access control information ACm (step S738).

If it is determined in step S734 that the reproduction can be performed in the current reproducing operation, license key Kc of the reproduction request tune and reproduction control information ACp recorded in license region 1415B of memory 1415 are provided onto bus BS4 (step S738).

License key Kc and reproduction control information ACp thus obtained are sent to encryption processing unit 1406 via contact Pf of selector switch 1446. Encryption processing unit 1406 encrypts license key Kc and reproduction control information ACp received via selector switch 1446 with session key Ks3, which is received from decryption processing unit 1412 via contact Pb of selector switch 1442, and provides encrypted data {Kc//ACp}Ks3 onto bus BS4 (step S738).

Encrypted data {Kc//ACp}Ks3 provided onto bus BS4 is sent to reproduction terminal 102 via interface 1424, terminal 1426 and memory card interface 1200.

In reproduction terminal 102, decryption processing unit 1510 decrypts encrypted data {Kc//ACp}Ks3 transmitted onto bus BS3 via memory card interface 1200, and license key Kc and reproduction control information ACp are accepted (steps S740 and S742). Decryption processing unit 1510 transmits license key Kc to decryption processing unit 1516, and provides reproduction control information ACp onto bus BS3.

Controller 1106 accepts reproduction control information ACp via bus BS3, and determines whether the reproduction is allowed or not (step S744).

If it is determined in step S744 from reproduction control information ACp that the reproduction is not allowed, the reproducing operation ends.

If it is determined in step S744 that the reproduction is allowed, controller 1106 issues a request for encrypted content data {Dc}Kc to memory card 110 via memory card interface 1200. Thereby, controller 1420 of memory card 110 obtains encrypted content data {Dc}Kc from memory 1415, and provides it to memory card interface 1200 via bus BS4, interface 1424 and terminal 1426.

Controller 1106 of reproduction terminal 102 obtains encrypted content data {Dc}Kc via memory card interface 1200, and provides encrypted content data {Dc}Kc to content reproducing circuit 1550 via bus BS3.

Decryption processing unit 1516 of content reproducing circuit 1550 decrypts encrypted content data {Dc}Kc with license key Kc sent from decryption processing unit 1510 to obtain content data Dc.

Content data Dc thus decrypted is provided to music reproducing unit 1518. Music reproducing unit 1518 reproduces content data Dc, and D/A converter 1519 converts digital signals into analog signals, and provides them to terminal 1530. The music data is sent from terminal 1530 via the external output device to headphones 130, and is reproduced. Thereby, the reproducing operation ends (step S746).

The operation of reproducing the encrypted content data in license-dedicated memory card 520 of personal computer 50 is likewise performed in accordance with a flowchart of FIG. 20.

In the description already given, license-dedicated memory card 520 is attached to personal computer 50, and personal computer 50 records the license in license-dedicated memory card 520. Instead of license-dedicated memory card 520, however, memory card 110 may be attached to personal computer 50, and only the license may be administered in the attached memory card.

Similarly to the case where memory card 110 is attached to cellular phone 100 or data reproduction terminal 102, the encrypted content data and the license administration information can be used by recording them in data region 1415C of license-dedicated memory card 520.

Further, instead of license-dedicated memory card 520, it is possible to use a license-dedicated memory card not having data region 1415C or a record device (semiconductor chip) dedicated to the license. In this case, the entry administration information is recorded on hard disk 530.

In personal computer 50, a function of license-dedicated memory card 520 may be achieved by a license administration program, which includes a cryptographic algorithm and achieves the anti-tamper module by software. In this case, log region 1415A and license region 1415B are provided on hard disk 530, are uniquely encrypted by the license administration program, and are configured to allow neither viewing nor rewriting of the contents in these regions only when accessed by the license administration program. Alternatively, these are recorded while keeping a relationship with hard disk 530 of personal computer 50 or controller 510, and are configured to allow access only in personal computer 50. Further, it is configured to invalidate the license, unless the license was shifted or copied in accordance with flowcharts of FIGS. 14 to 16.

According to the embodiment of the invention, the memory card on the sender side administers the shift of the license based on the validity flag. When the communication is interrupted during shifting of the license, the memory card on the sender side validates the validity flag after determining that the opposite side is the same as the destination of the interrupted shifting. Therefore, the license can be easily restored on the sender side.

According to the description already given, the validity flag is used in the operation of shifting the license so as to achieve such a state that the license to be shifted can be restored and is disabled in the memory card on the sender side. In addition to the above, the above state can be achieved by such a configuration that log region 1415A is expanded to store a saved license for one license in the send log of log region 1415A in memory 1415 of the memory card, the license to be shifted is saved in the send log, and the entry storing the shifted license is erased. This configuration does not require the validity flag for each entry.

In the above configuration, the shift processing is performed as follows. In step S350 illustrated in FIG. 15, memory card 110 on the sender side stores the designated entry number and the license at the designated entry number in the send log of log region 1415A, and erases the license at the designated entry number. In memory card 120 on the receiver side, processing is performed similarly to that in step S364 except for that license (license ID, content ID, license key Kc, access control information ACm and reproduction control information ACp) is stored in the entry designated by the entry number. Further, in the restoring processing, processing is performed similarly to that in step S458 illustrated in FIG. 19 except for that the saved license is copied to the entry designated by the entry number in the send log.

Likewise, setting and determining of the validity flag are not required in each specific processing of the distribution processing. In this case, step S160 in FIG. 10 is changed to "license (license ID, content ID, license key Kc, access control information ACm and reproduction control information ACp) is stored in the entry designated by the entry number". In the reproduction processing, the validity flag is not operated so that the processing in step S733 illustrated in FIG. 20 is not required.

The description has been given, by way of example, on the license restoring processing for the license used for decrypting the encrypted content data. However, the target to be restored according to the invention is not restricted to the license for decrypting the encrypted content data, and may be personal information, credit card information and others, each of which is not allowed to exist in two or more places at the same time. The foregoing processing can be effected on these kinds of information.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

According to the invention, the memory card on the sender side controls the shifting of the license based on the validity flag. When the communication is interrupted during shifting of the license, the memory card on the sender side validates the validity flag after determining that the opposite side is the same as the destination of the interrupted shifting. Therefore, the license can be easily restored on the sender side. Further, the invention is applied to the data storage device, which can restore the license to be shifted even when the communication is interrupted during the shifting of the license.

The invention claimed is:

1. A data storage device for shifting specific data allowed to exist uniquely to a different data storage device, comprising:
    a history information holding unit holding first history information for specifying processing of shifting said specific data to said different data storage device;
    a storing unit for storing encrypted content data;
    a specific data holding unit holding said specific data and an output enable/disable flag indicating whether a part or a whole of said specific data can be externally output or not; and
    a control unit, wherein
    said control unit, in response to a request for shifting of said specific data, sets said output enable/disable flag to disable the output of said specific data and then shifts said specific data to said different storage device, when said output enable/disable flag is set to enable the output of said specific data;
    said control unit, in response to a request for shifting of said specific data, does not shift said specific data to said different storage device and does not change said output enable/disable flag, when said output enable/disable flag is set to disable the output of said specific data;
    said control unit receives, in response to a request for restoration of said specific data, communication information representing a state of communication with said different data storage device and held in said different data storage device and second history information for specifying said shifting processing held in said different data storage device, checks the state of communication with said different data storage device based on said communication information, and determines whether said second history information matches with said first history information or not, when said communication information represents that said shifting has been discontinued before completion;
    said control unit sets said output enable/disable flag to enable the output of said specific data when it is determined that said second history information matches with said first history information; and
    said specific data is a license for decrypting the encrypted content data.

2. The data storage device according to claim 1, wherein
    said first history information is a first session key produced by said different data storage device when the communication for said shifting is established, and received from said different data storage device, and
    said second history information is a second session key produced by said different data storage device when the communication for said shifting is established, and being the same as said first session key held by said different data storage device.

3. The data storage device according to claim 1, further comprising:
    a signature determining unit determining validity of said communication information and said second history information based on an electronic signature, wherein
    said control unit further receives the electronic signature added to said communication information and said second history information from said different data storage device together with said communication information and said second history information, and determines said communication state and the fact that said first history information matches with said second history information when said signature determining unit confirms the validity of said communication information and said second history information.

4. The data storage device according to claim 1, further comprising:
    a session key producing unit producing a session key for specifying the communication with said different data storage device; and a decrypting unit decrypting the data encrypted with the session key produced by said session key producing unit, wherein, in an operation of restoring said specific data, said session key producing unit produces a third session key specifying communication for restoring said specific data, and said control unit sends said third session key to said different data storage device, and receives the second history information encrypted with said third session key from said different data storage device.

5. The data storage device according to claim 3, further comprising:

a session key producing unit producing a session key for specifying the communication with said different data storage device; and a decrypting unit decrypting the data encrypted with the session key produced by said session key producing unit, wherein, in an operation of restoring said specific data, said session key producing unit produces a third session key specifying communication for restoring said specific data, and said control unit sends said third session key to said different data storage device, and receives the second history information encrypted with said third session key and data of said electronic signature encrypted with said third session key from said different data storage device.

6. The data storage device according to claim 1, wherein said history information holding unit holds first data specifying information included in said specific data to be shifted together with said first history information, and said control unit further determines whether second data specifying information received from said different data storage device and being to be shifted matches with said first data specifying information or not, and when said second data specifying information matches with said first data specifying information, said control unit determines said communication information, and confirms the matching of said first history information with said second history information.

7. The data storage device according to claim 6, further comprising:

a signature determining unit determining validity of said communication information, said second history information and said second data specifying information based on an electronic signature, wherein said control unit further receives the electronic signature added to said communication information, said second history information and said second data specifying information together with said communication information, said second history information and said second data specifying information, and, when said signature determining unit confirms the validity of said communication information, said second history information and said second data specifying information, said control unit confirms the matching of said second data specifying information with said first data specifying information, determines said communication information and confirms the matching of said first history information with said second history information.

8. The data storage device according to claim 1, further comprising:

a communication information holding unit holding additional communication information representing a state of communication with said different data storage device or an additional data storage device other than said different data storage device; and an additional history information holding unit holding third history information for specifying processing of shifting the specific data from said different data storage device or said additional data storage device, wherein when said control unit receives, from said different data storage device or said additional data storage device, the specific data to be shifted in the processing of shifting said specific data, said control unit updates the additional communication information held by said communication information holding unit in accordance with progression of the communication for the receiving, records said third history information in said additional history information holding unit, and provides said additional communication information and said third history information in accordance with an externally applied request for output of the history information.

9. The data storage device according to claim 2, further comprising:

a communication information holding unit holding additional communication information representing a state of communication with said different data storage device or an additional data storage device other than said different data storage device;

an additional history information holding unit holding third history information for specifying processing of shifting the specific data from said different data storage device or said additional data storage device; and a session key producing unit producing a session key for specifying communication with said different data storage device or said additional data storage device, wherein when the communication is established for receiving the specific data to be shifted from said different data storage device or said additional data storage device:

said session key producing unit produces a fourth session key specifying communication for receiving, from said different data storage device or said additional data storage device, the specific data to be shifted in said processing of shifting the specific data, and said control unit sends said fourth session key to said different data storage device or said additional data storage device, stores said fourth session key as said third history information in said additional history information holding unit, updates the additional communication information held by said communication information holding unit in accordance with progression of the communication for the receiving, and provides said additional communication information and said third history information in response to an externally applied request for output of the history information.

10. The data storage device according to claim 3, further comprising:

a communication information holding unit holding additional communication information representing a state of communication with said different data storage device or an additional data storage device other than said different data storage device;

an additional history information holding unit holding third history information for specifying processing of shifting the specific data from said different data storage device or said additional data storage device; and an electronic signature producing unit producing an electronic signature for said additional communication information and said third history information, wherein when receiving, from said different data storage device or said additional data storage device, the specific data to be shifted in said processing of shifting the specific data, said control unit updates the additional communication information held by said communication information holding unit in accordance with progression of the communication for the receiving, records said third history information in said additional history information holding unit, and provides said additional communication information, said third history information and said electronic signature in response to an externally applied request for output of the history information.

11. The data storage device according to claim 4, further comprising:
- a communication information holding unit holding additional communication information representing a state of communication with said different data storage device or an additional data storage device other than said different data storage device;
- an additional history information holding unit holding third history information for specifying processing of shifting the specific data from said different data storage device or said additional data storage device; and
- an encryption processing unit performing encryption with a fourth session key provided from said different data storage device or said additional data storage device, wherein
- when receiving, from said different data storage device or said additional data storage device, the specific data to be shifted in said processing of shifting the specific data, said control unit updates the additional communication information held by said communication information holding unit in accordance with progression of the communication for the receiving, records said third history information in said additional history information holding unit, and provides said additional communication information and said third history information encrypted with said fourth session key by said encryption processing unit in response to an externally applied request for output of the history information.

12. The data storage device according to claim 5, further comprising:
- a communication information holding unit holding additional communication information representing a state of communication with said different data storage device or an additional data storage device other than said different data storage device;
- an additional history information holding unit holding third history information for specifying processing of shifting the specific data from said different data storage device or said additional data storage device;
- an encryption processing unit encrypting data with a fifth session key provided from said different data storage device or said additional data storage device; and
- an electronic signature producing unit producing an electronic signature for said additional communication information and third history information encrypted by said encryption processing unit with an externally provided fourth session key, wherein
- said encryption processing unit encrypts said third history information and said electronic signature independently of each other with said fourth session key,
- when receiving, from said different data storage device or said additional data storage device, the specific data to be shifted in said processing of shifting the specific data, said control unit updates the additional communication information held by said communication information holding unit in accordance with progression of the communication for the receiving, records said third history information in said additional history information holding unit, and provides said additional communication information said third history information encrypted with said fourth session key and said electronic signature encrypted with said fourth session key in accordance with an externally applied request for output of the history information.

13. The data storage device according to claim 6, further comprising:
- a communication information holding unit holding additional communication information representing a state of communication with said different data storage device or an additional data storage device other than said different data storage device as well as third data specifying information specifying the specific data to be shifted from said different data storage device or said additional data storage device;
- an additional history information holding unit holding third history information for specifying processing of shifting the specific data from said different data storage device or said additional data storage device; and
- an electronic signature producing unit producing an electronic signature for said additional communication information, said third history information and said third data specifying information, wherein
- when receiving, from said different data storage device or said additional data storage device, the specific data to be shifted in said processing of shifting the specific data, said control unit updates the additional communication information held by said communication information holding unit in accordance with progression of the communication for the receiving, records said third history information and said third data specifying information in said communication information unit and provides said third data specifying information and said additional communication information recorded in said communication information holding unit as well as third history information held in said additional history information holding unit and electronic signature produced by said electronic signature producing unit in accordance with an externally applied request for output of the history information.

14. The data storage device according to claim 7, further comprising:
- a communication information holding unit holding additional communication information representing a state of communication with said different data storage device or an additional data storage device other than said different data storage device as well as third data specifying information specifying the specific data to be shifted from said different data storage device or said additional data storage device; and
- an additional history information holding unit holding third history information for specifying processing of shifting the specific data from said different data storage device or said additional data storage device, wherein
- when receiving, from said different data storage device or said additional data storage device, the specific data to be shifted in said processing of shifting the specific data, said control unit updates the additional communication information held by said communication information holding unit in accordance with progression of the communication for the receiving, records said third history information and said third data specifying information in said communication information unit and provides said third data specifying information and said additional communication information recorded in said communication information holding unit as well as third history information held in said additional history information holding unit in accordance with an externally applied request for output of the history information.

* * * * *